(12) United States Patent
Suh et al.

(10) Patent No.: US 12,081,889 B2
(45) Date of Patent: Sep. 3, 2024

(54) IMAGE SENSOR INCLUDING CMOS IMAGE SENSOR PIXEL AND DYNAMIC VISION SENSOR PIXEL

(71) Applicant: SAMSUNG ELECTRONICS CO., LTD., Suwon-si (KR)

(72) Inventors: Yunjae Suh, Incheon (KR); Junseok Kim, Hwaseong-si (KR); Hyunsurk Ryu, Hwaseong-si (KR); Keun Joo Park, Seoul (KR); Masamichi Ito, Hwaseong-si (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/297,233

(22) Filed: Apr. 7, 2023

(65) Prior Publication Data

US 2023/0247321 A1   Aug. 3, 2023

Related U.S. Application Data

(63) Continuation of application No. 17/492,059, filed on Oct. 1, 2021, now Pat. No. 11,637,983, which is a (Continued)

(30) Foreign Application Priority Data

Sep. 7, 2018 (KR) .................. 10-2018-0107280
Mar. 13, 2019 (KR) .................. 10-2019-0028938

(51) Int. Cl.
*H04N 25/75* (2023.01)
*H04N 25/47* (2023.01)
*H04N 25/77* (2023.01)

(52) U.S. Cl.
CPC ............. *H04N 25/75* (2023.01); *H04N 25/47* (2023.01); *H04N 25/77* (2023.01)

(58) Field of Classification Search
CPC ........ H04N 25/75; H04N 25/47; H04N 25/77; H04N 25/79; H04N 25/76
See application file for complete search history.

(56) References Cited

U.S. PATENT DOCUMENTS 8,780,240 B2   7/2014 Posch et al.
9,001,220 B2   4/2015 Kim et al.
(Continued)

FOREIGN PATENT DOCUMENTS

CN   103533263 A   1/2014
CN   105163048 A   12/2015
(Continued)

OTHER PUBLICATIONS

Communication dated Aug. 30, 2023, issued by the United States Patent and Trademark Office in Counterpart U.S. Appl. No. 18/100,392.

*Primary Examiner* — Gevell V Selby
(74) *Attorney, Agent, or Firm* — Sughrue Mion, PLLC

(57) ABSTRACT

An image sensor includes a CIS (CMOS image sensor) pixel, a DVS (dynamic vision sensor) pixel, and an image signal processor. The CIS pixel includes a photoelectric conversion device generating charges corresponding to an incident light and a readout circuit generating an output voltage corresponding to the generated charges. The DVS pixel detects a change in an intensity of the incident light based on the generated charges to output an event signal and does not include a separate photoelectric conversion device. The image signal processor allows the photoelectric conversion device to be connected to the readout circuit or the DVS pixel.

22 Claims, 24 Drawing Sheets

Related U.S. Application Data continuation of application No. 16/552,299, filed on Aug. 27, 2019, now Pat. No. 11,140,349.

(56) References Cited

U.S. PATENT DOCUMENTS

| | | | |
|---|---|---|---|
| 9,165,968 B2 | 10/2015 | Chao et al. | |
| 9,631,974 B2 | 4/2017 | Delbruck et al. | |
| 9,693,035 B2 | 6/2017 | Williams et al. | |
| 9,967,479 B2 | 5/2018 | Matolin et al. | |
| 9,986,179 B2 | 5/2018 | Govil | |
| 10,674,104 B2 | 6/2020 | Park et al. | |
| 10,838,539 B2 | 11/2020 | Hwang et al. | |
| 11,140,349 B2 | 10/2021 | Suh et al. | |
| 2012/0257789 A1 | 10/2012 | Lee et al. | |
| 2014/0009648 A1 | 1/2014 | Kim et al. | |
| 2014/0368712 A1* | 12/2014 | Park | H04N 25/745 |
| | | | 348/308 |
| 2015/0042855 A1* | 2/2015 | Baek | H04N 25/13 |
| | | | 348/294 |
| 2015/0069218 A1 | 3/2015 | Cho et al. | |
| 2015/0302710 A1 | 10/2015 | Jin et al. | |
| 2015/0334326 A1 | 11/2015 | Lim et al. | |
| 2016/0093273 A1 | 3/2016 | Wang et al. | |
| 2017/0221954 A1* | 8/2017 | Madurawe | H01L 25/043 |
| 2018/0160110 A1 | 6/2018 | Koesters et al. | |
| 2018/0191972 A1 | 7/2018 | Berner et al. | |
| 2018/0191982 A1 | 7/2018 | Berner et al. | |
| 2018/0249104 A1 | 8/2018 | Sasago et al. | |
| 2018/0262705 A1* | 9/2018 | Park | H04N 25/79 |
| 2021/0409637 A1 | 12/2021 | Sakakibara et al. | |
| 2023/0013026 A1 | 1/2023 | Tsai | |

FOREIGN PATENT DOCUMENTS

| | | |
|---|---|---|
| KR | 10-2014-0005421 A | 1/2014 |
| KR | 10-2014-0146337 A | 12/2014 |
| KR | 10-2016-0038693 A | 4/2016 |

* cited by examiner

IMAGE SENSOR INCLUDING CMOS IMAGE SENSOR PIXEL AND DYNAMIC VISION SENSOR PIXEL

CROSS-REFERENCE TO RELATED APPLICATIONS

This is a continuation of U.S. application Ser. No. 17/492,059 filed Oct. 1, 2021, which is a continuation of U.S. application Ser. No. 16/552,299 filed Aug. 27, 2019, which claims priority under 35 U.S.C. § 119 to Korean Patent Application No. 10-2018-0107280 filed on Sep. 7, 2018, in the Korean Intellectual Property Office and Korean Patent Application No. 10-2019-0028938 filed on Mar. 13, 2019, in the Korean Intellectual Property Office, the disclosures of which are incorporated by reference herein in their entireties.

BACKGROUND

The disclosure relates to an image sensor, and more particularly, to an image sensor including two different kinds of pixels.

Conventional types of image sensors include a complementary metal-oxide semiconductor (CMOS) image sensor and a dynamic vision sensor. The CMOS image sensor may be advantageous in that a captured image is provided to a user without modification, but the CMOS image sensor may be disadvantageous in that the amount of data to be processed is high. Because the dynamic vision sensor detects only an event in which an intensity of light changes and provides output of the detected event, the dynamic vision sensor may be advantageous in that the amount of data to be processed is low, but may be disadvantageous in that a size of the dynamic vision sensor is larger than a size of the CMOS image sensor.

However, both the CMOS image sensor and the dynamic vision sensor may require a photoelectric conversion device for detecting a light. In general, because photoelectric conversion devices occupy most of the size of an image sensor, when the CMOS image sensor and the dynamic vision sensor are implemented together in one device, the size of the device may increase. Therefore, there is a demand on the architecture of the image sensor to reduce the size of the image sensor and decreasing manufacturing costs of the image sensor.

SUMMARY

Aspects of embodiments of the disclosure provide an architecture for a CMOS image sensor and a dynamic vision sensor sharing a photoelectric conversion device.

Aspects of the embodiments provide an architecture in which the dynamic vision sensor uses photoelectric conversion included in the CMOS image sensor.

According to an embodiment, an image sensor includes a CIS pixel that includes a photoelectric conversion device configured to generate charges corresponding to an incident light that is incident on the CIS pixel and a readout circuit configured to generate an output voltage corresponding to the charges, a dynamic vision sensor (DVS) pixel configured to detect a change in intensity of the incident light based on the charges generated by the photoelectric conversion device, and output an event signal based on the change in intensity, and an image signal processor configured to selectively control the image sensor to generate image data of the image sensor based on the output voltage generated by the CIS pixel and generate the image data based on the event signal generated by the DVS pixel.

According to an embodiment, an image sensor includes a CIS pixel that includes a photoelectric conversion device configured to generate charges corresponding to an incident light that is incident on the CIS pixel, a drive transistor, the drive transistor comprising a gate electrode connected to a floating diffusion node to which the charges generated by the photoelectric conversion device are transferred, and a reset transistor configured to reset a voltage of the floating diffusion node, a dynamic vision sensor (DVS) pixel, the DVS pixel comprising a log current source, the DVS pixel configured to detect a change in intensity of the incident light based on the charges generated by the photoelectric conversion device, and output an event signal based on the change in intensity, and an image signal processor configured to connect a gate electrode of the reset transistor and an end of the drive transistor to the log current source.

According to an embodiment, an image sensor includes a first substrate in which a CIS pixel array including a plurality of CMOS image sensor (CIS) pixels is formed, each of the CIS pixels including a photoelectric conversion device configured to generate charges corresponding to an incident light that is incident on the CIS pixel and a readout circuit configured to generate an output voltage corresponding to the charges generated by the photoelectric conversion device, a second substrate on which a DVS pixel array comprising a plurality of dynamic vision sensor (DVS) pixels is formed, each DVS pixel of the DVS pixel array configured to detect a change in intensity of the incident light based on the charges generated by the CIS pixel array to output an event signal based on the change in intensity, and an image signal processor configured to selectively control the image sensor to generate image data of the image sensor based on the output voltage and generate the image data based on the event signal generated by the DVS pixel array.

BRIEF DESCRIPTION OF THE FIGURES

The above and other objects and features of the disclosure will become apparent by describing in detail embodiments thereof with reference to the accompanying drawings, in which.

DETAILED DESCRIPTION

Below, embodiments of the disclosure are described in detail and clearly to such an extent that an artisan of ordinary skill in the art to which this disclosure pertains may easily implements the embodiments.

Components that are described in the detailed description with reference to the terms "unit," "module," "~er or ~or," etc. and function blocks illustrated in drawings will be implemented with software, hardware, or a combination thereof. In an embodiment, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof. In addition, unless otherwise indicated in the present specification, the expression "a first component is connected to a second component" includes the configuration in which two components are indirectly connected with a third component interposed therebetween.

Figure 1:
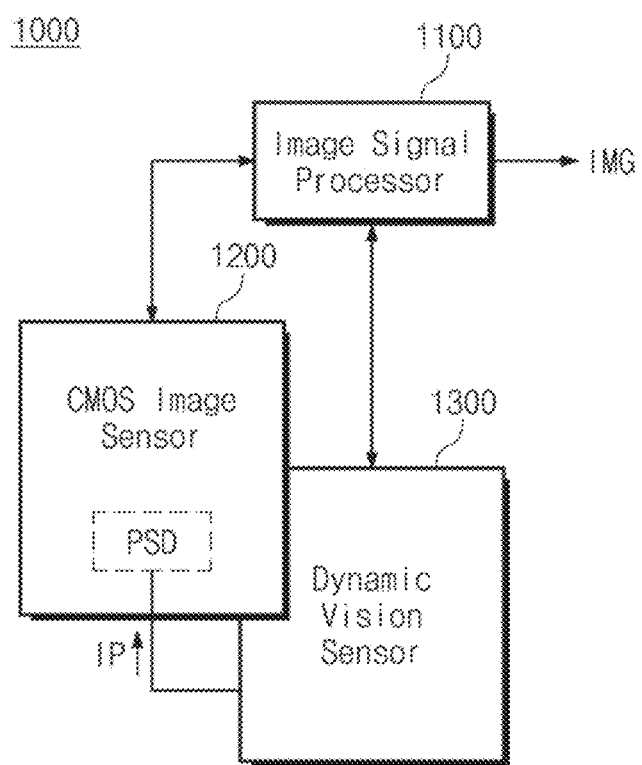
FIG. 1 illustrates an image sensor according to an embodiment of the disclosure.

FIG. 1 illustrates an image sensor 1000 according to an embodiment of the disclosure. The image sensor 1000 includes an image signal processor 1100, a complementary metal-oxide semiconductor (CMOS) image sensor 1200, and a dynamic vision sensor (DVS) 1300.

The image signal processor 1100 may process signals output from the CMOS image sensor 1200 and/or the dynamic vision sensor 1300 and may generate and output an image IMG. In an embodiment, the image signal processor 1100 may process frame-based image data received from the CMOS image sensor 1200 and may generate the image IMG based on the frame-based image data. Alternatively, the image signal processor 1100 may process packet-based or frame-based image data received from the dynamic vision sensor 1300 and may generate the image IMG based on the packet-based or the frame-based image data.

The image signal processor 1100 may perform various processing on the image data received from the CMOS image sensor 1200. For example, the image signal processor 1100 may perform various processing such as color interpolation, color correction, auto white balance, gamma correction, color saturation correction, formatting, bad pixel correction, and hue correction.

The image signal processor 1100 may perform various processing on the image data received from the dynamic vision sensor 1300. For example, the image signal processor 1100 may correct (or calibrate) a timestamp value of a noise pixel, a hot pixel, or a dead pixel by using a temporal correlation between timestamp values of adjacent pixels of the dynamic vision sensor 1300.

The CMOS image sensor 1200 includes a plurality of CMOS image sensor (CIS) pixels, each CIS pixel among the plurality of CIS pixels including a photoelectric conversion device (PSD). In contrast, each DVS pixel among the plurality of DVS pixels of the dynamic vision sensor 1300 does not include a photoelectric conversion device. Instead, the dynamic vision sensor 1300 may utilize the photoelectric conversion device PSD of the CMOS image sensor 1200. That is, the CMOS image sensor 1200 and the dynamic vision sensor 1300 may share the photoelectric conversion device PSD.

In an embodiment, when the CMOS image sensor 1200 is operating to generate the frame-based image data, a path electrically connecting the photoelectric conversion device PSD and the DVS 1300 may be blocked, disconnected, or otherwise inaccessible to the DVS 1300. In contrast, when the CMOS image sensor 1200 is not operating to generate the frame-based image data, the photoelectric conversion device PSD and the DVS 1300 may be electrically connected. Thereby, when the CMOS image sensor 1200 is not operating to generate the frame-based image data and is not utilizing the photoelectric conversion device PSD, the DVS 1300 may instead utilize the photoelectric conversion device PSD for generating the packet-based or the frame-based image data. In an embodiment, the image signal processor 1100 may control an operating mode of the image sensor 1000. For example, the image signal processor 1100 may generate at least one control signal for changing an operating mode to control switching between various operating modes. The configuration that the CMOS image sensor 1200 and the dynamic vision sensor 1300 share a photoelectric conversion device may reduce the size and manufacturing costs of the image sensor 1000. A detailed configuration will be more fully described below.

Herein, a CIS pixel of the CMOS image sensor 1200 and a DVS pixel of the DVS 1300 sharing a photoelectric conversion device will be described, but the such concept may be applied to different types and combinations of sensors and pixels other than a CMOS sensor and pixel and a DVS sensor and pixel. For example, the concept may be applied to a combination of a charge coupled device (CCD)-type pixel and a CIS pixel. Also, the concept may be applied to a combination of a CCD-type pixel and a DVS pixel. In addition, the concept may be applied to an image sensor including a CCD-type pixel, a CIS pixel, and a DVS pixel. The types of sensors and pixels, and combinations thereof, are not limited to the above described types and combinations.

Figure 2:
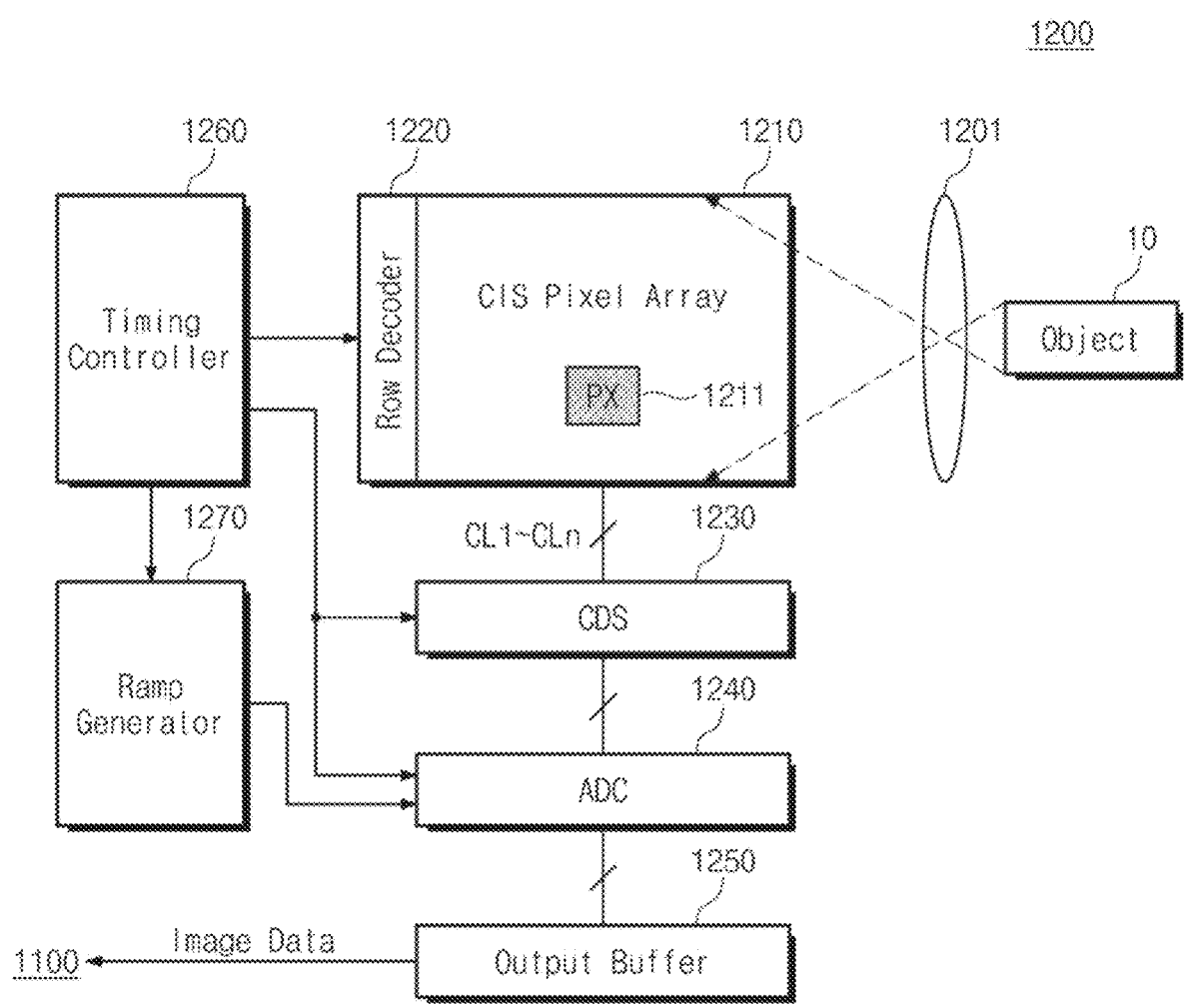
FIG. 2 illustrates a configuration of a CMOS image sensor of FIG. 1.

FIG. 2 illustrates a configuration of the CMOS image sensor 1200 of FIG. 1.

The CMOS image sensor 1200 is configured to generate image data of an object 10 incident through a lens 1201. The CMOS image sensor 1200 includes a CIS pixel array 1210, a row decoder 1220, a correlated-double sampler (CDS)

1230, an analog-to-digital converter (ADC) 1240, an output buffer 1250, a timing controller 1260, and a ramp generator 1270.

The CIS pixel array 1210 may include a plurality of CIS pixels (PX) 1211 arranged in rows and columns. In an embodiment, and each CIS pixel among the plurality of CIS pixels 1211 may have a three transistor (3TR) pixel structure in which a pixel is implemented with three transistors, a four transistor (4TR) pixel structure in which a pixel is implemented with four transistors, or a five transistor (5TR) pixel structure in which a pixel is implemented with five transistors. Alternatively, at least two CIS pixels of the plurality of CIS pixels constituting the CIS pixel array 1210 may share the same floating diffusion region FD (or a floating diffusion node). However, the structure of the CIS pixel is not limited to the above configuration.

The row decoder 1220 may select and drive a row of the CIS pixel array 1210. In an embodiment, the row decoder 1220 decodes a row address and/or control signals that are output from the timing controller 1260 and generates control signals for selecting and driving the row of the CIS pixel array 1210 indicated by the row address and/or control signals. For example, the row decoder 1220 may generate a select signal VSEL, a reset signal VRST, and a transfer signal VTG and may transmit the generated signals VSEL, VRST, and VTG to pixels corresponding to the selected row.

The correlated-double sampler 1230 may sequentially sample and hold a set of a reference signal and an image signal provided from the CIS pixel array 1210 through column lines CL1 to CLn. In other words, the correlated-double sampler 1230 may sample and hold levels of the reference signal and the image signal corresponding to each of columns. The correlated-double sampler 1230 may provide the set of the reference signal and the image signal, which are sampled with regard to each column, to the analog-to-digital converter 1240 under control of the timing controller 1260.

The analog-to-digital converter 1240 may convert a correlated-double sampling signal of each column output from the correlated-double sampler 1230 into a digital signal. In an embodiment, the analog-to-digital converter 1240 may compare the correlated-double sampling signal and a ramp signal output from the ramp generator 1270 and may generate a digital signal corresponding to a comparison result.

The output buffer 1250 may temporarily store the digital signal provided from the analog-to-digital converter 1240.

The timing controller 1260 may control an operation of at least one of the CIS pixel array 1210, the row decoder 1220, the correlated-double sampler 1230, the analog-to-digital converter 1240, the output buffer 1250, and the ramp generator 1270.

The ramp generator 1270 may generate the ramp signal and may provide the ramp signal to the analog-to-digital converter 1240.

For example, at least a part of the row decoder 1220, the correlated-double sampler 1230, the analog-to-digital converter 1240, the output buffer 1250, the timing controller 1260, and the ramp generator 1270 may be called a "CIS peripheral circuit."

Figure 3:
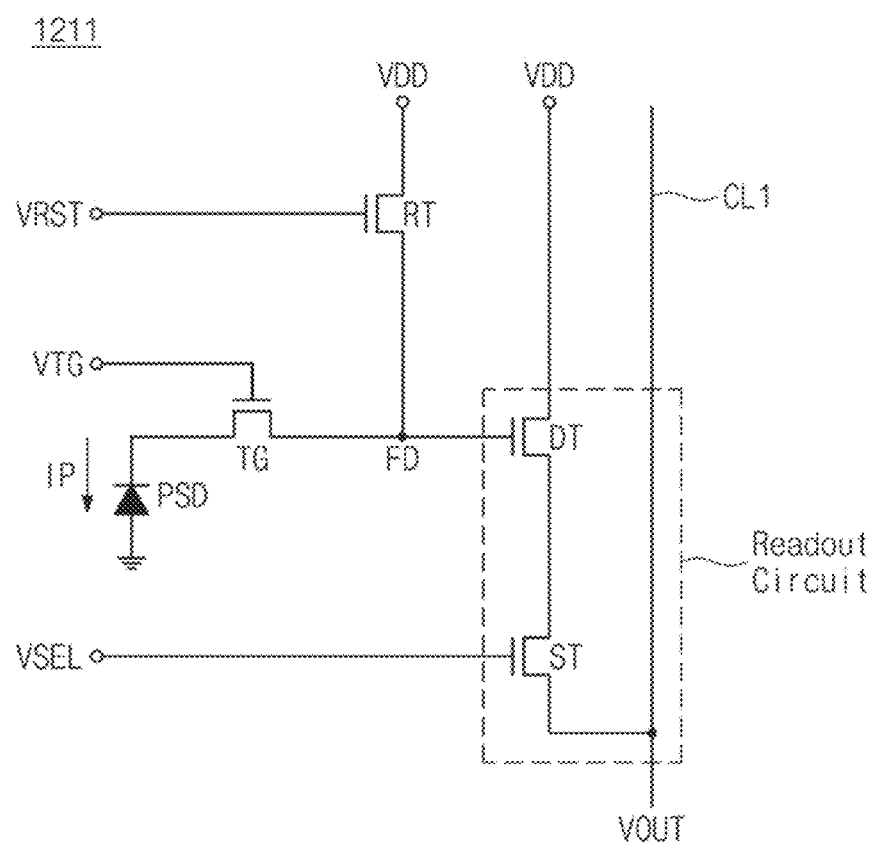
FIG. 3 illustrates a circuit diagram of a configuration of a CIS pixel of FIG. 2.

FIG. 3 illustrates an exemplary configuration of the CIS pixel 1211 of FIG. 2. In an embodiment, the CIS pixel 1211 may have a four transistor (4TR) structure including four transistors. The CIS pixel 1211 may include a photoelectric conversion device PSD, a transfer transistor TG, a reset transistor RT, a drive transistor DT, and a select transistor ST.

The photoelectric conversion device PSD may generate photoelectrons (hereinafter referred to as a "charge") in response to an incident light. That is, the photoelectric conversion device PSD may convert a light signal to an electrical signal to generate a photocurrent IP. For example, the photoelectric conversion device PSD may include a photodiode, a photo transistor, a pinned photodiode, or any other similar device.

The transfer transistor TG may transfer charges generated by the photoelectric conversion device PSD to the floating diffusion region FD. For example, a source end of the transfer transistor TG may be connected to the photoelectric conversion device PSD, and a drain end of the transfer transistor TG may be connected to the floating diffusion region FD. The transfer transistor TG may be turned on or turned off in response to the transfer signal VTG received from the row decoder 1220 (refer to FIG. 2) at the gate of the transfer transistor TG.

The floating diffusion region FD may have a function to detect charges corresponding to the amount of incident light. During a time when the transfer signal VTG is activated, charges provided from the photoelectric conversion device PSD may be accumulated in the floating diffusion region FD. The floating diffusion region FD may be connected with a gate terminal of the drive transistor DT that operates as a source follower amplifier. The floating diffusion region FD may be reset to a power supply voltage VDD that is provided when the reset transistor RT is turned on.

The reset transistor RT may be reset by the reset signal VRST and may provide the power supply voltage VDD to the floating diffusion region FD. In this case, the charges accumulated in the floating diffusion region FD may move to a terminal for the power supply voltage VDD, and a voltage of the floating diffusion region FD may be reset. Even though the description is given as the power supply voltage VDD is used as a voltage to be applied to the floating diffusion region FD, various levels of voltages (i.e., a reset voltage) may be used to reset the floating diffusion region FD.

The drive transistor DT may operate as a source follower amplifier. The drive transistor DT may amplify a change in an electrical potential of the floating diffusion region FD and may output an output voltage VOUT corresponding to an amplification result through the first column line CL1. An embodiment is illustrated in FIG. 3 as the CIS pixel 1211 is connected to the first column line CL1.

The select transistor ST may be driven by the select signal VSEL and may select a pixel to be read in the unit of a row. When the select transistor ST is turned on, a potential of the floating diffusion region FD may be amplified through the drive transistor DT and may be transferred to a drain electrode of the select transistor ST.

In an embodiment, the drive transistor DT and the select transistor ST may be called a "readout circuit." That is, the readout circuit may generate the output voltage VOUT corresponding to charges accumulated in the floating diffusion region FD.

Figure 4:
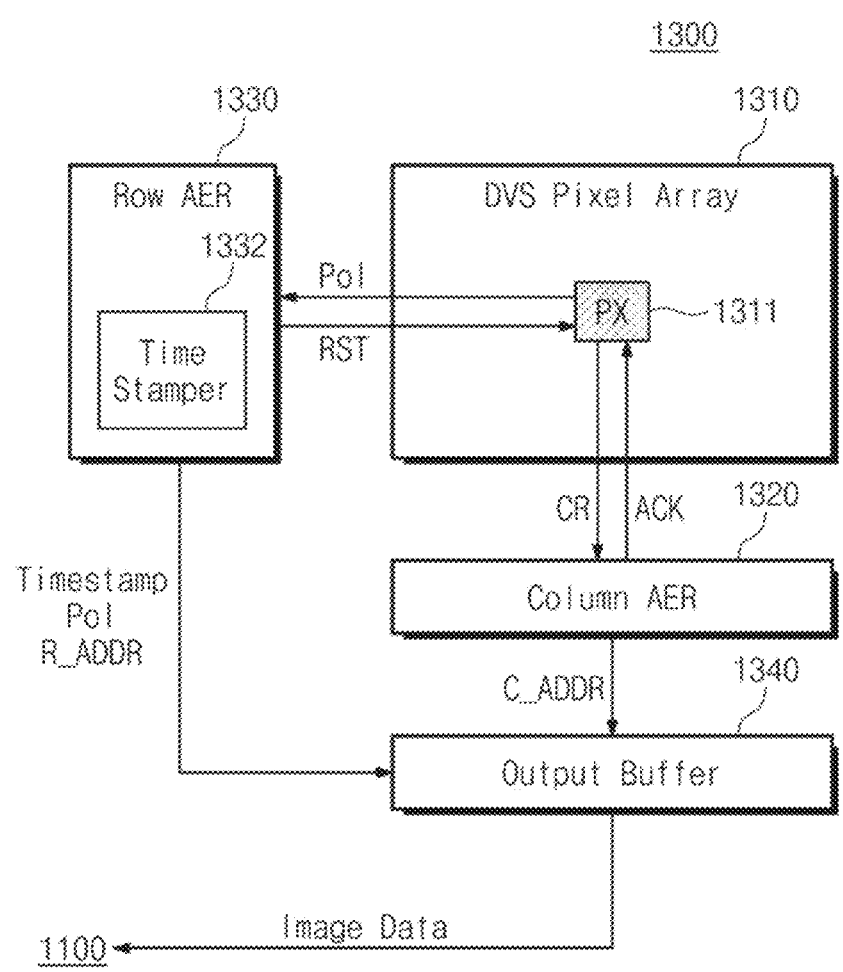
FIG. 4 illustrates a configuration of a dynamic vision sensor of FIG. 1.

FIG. 4 illustrates an exemplary configuration of the dynamic vision sensor 1300 of FIG. 1.

The dynamic vision sensor 1300 may include a DVS pixel array 1310, a column address event representation (AER) circuit 1320, a row AER circuit 1330, and an output buffer 1340. The dynamic vision sensor 1300 may detect an event when an intensity of light incident on a DVS pixel changes, may determine a type of the detected event (i.e., whether the detected event is an event that the intensity of light increases or an event that the intensity of light decreases), and may output a value corresponding to the event. For example, the event may mainly occur in an outline of a moving object. Unlike the CMOS image sensor 1200 (refer to FIG. 1), the dynamic vision sensor 1300 may output only a value corresponding to a light, the intensity of which changes, thus markedly reducing the amount of data to be processed by the dynamic vision sensor 1300 and/or the image signal processor 1100 (refer to FIG. 1).

The DVS pixel array 1310 may include a plurality of DVS pixels arranged along a plurality of rows and a plurality of columns in the form of a matrix. A DVS pixel detecting an event, from among the plurality of DVS pixels of the DVS pixel array 1310, may output a signal (i.e., a column request) CR indicating that the event that the intensity of light increases or decreases occurs, to the column AER circuit 1320.

The column AER circuit 1320 may output an acknowledge signal ACK to the DVS pixel in response to the column request CR received from the DVS pixel detecting the event. The DVS pixel that receives the acknowledge signal ACK may output polarity information PoI of the event to the row AER circuit 1330. The column AER circuit 1320 may generate a column address C_ADDR of the DVS pixel detecting the event, based on the column request CR received from the pixel detecting the event.

The row AER circuit 1330 may receive the polarity information PoI from the DVS pixel detecting the event. The row AER circuit 1330 may generate a timestamp including information about a time when the event occurs, based on the polarity information PoI. In an embodiment, the timestamp may be generated by a time stamper 1332 provided in the row AER circuit 1330. For example, the time stamper 1332 may be implemented by using a period of time generated in units of several microseconds to tens microseconds. The row AER circuit 1330 may output a reset signal RST to the DVS pixel detecting the event, in response to the polarity information PoI. The DVS pixel detecting the event may be reset by the reset signal RST. In addition, the row AER circuit 1330 may generate a row address R_ADDR of the DVS pixel detecting the event.

The row AER circuit 1330 may control a period when the reset signal RST is generated. For example, to prevent a workload from increasing due to occurrence of a large quantity of events, the row AER circuit 1330 may control a period when the reset signal RST is generated, such that an event does not occur during a specific period. That is, the row AER circuit 1330 may control a refractory period of occurrence of the event.

The output buffer 1340 may generate a packet based on the timestamp, the column address C_ADDR, the row address R_ADDR, and the polarity information PoI. The output buffer 1340 may add a header indicating a start of a packet at the front of the packet and a tail indicating an end of the packet at the rear of the packet.

For example, at least a part of the column AER circuit 1320, the row AER circuit 1330, and the output buffer 1340 may be called a "DVS peripheral circuit."

Figure 5:
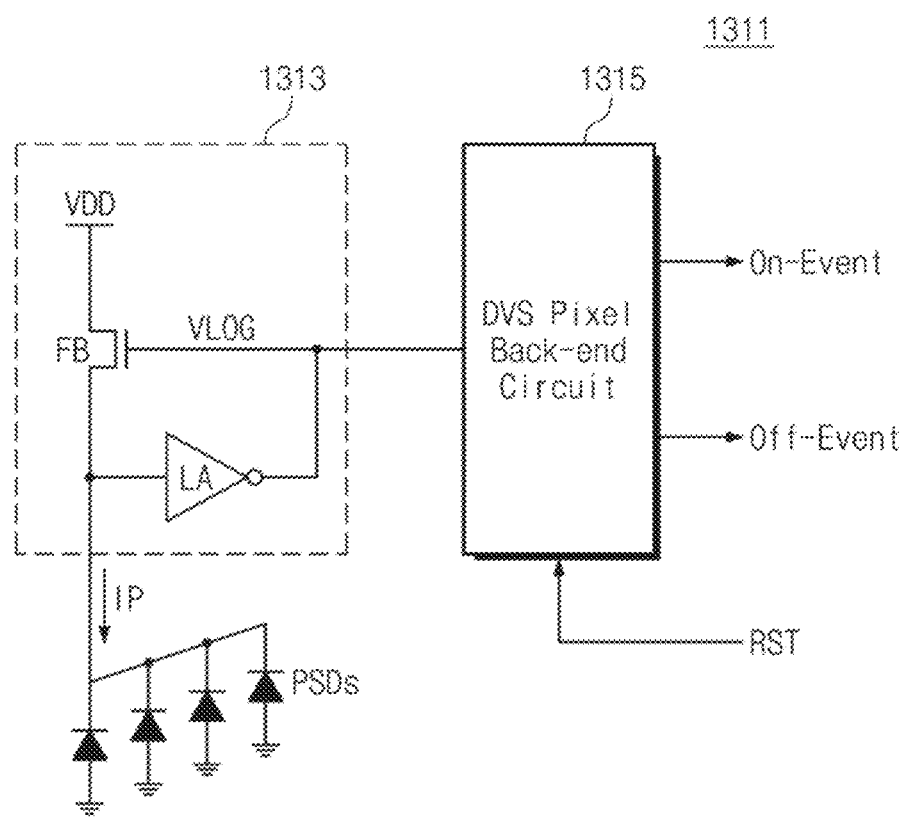
FIG. 5 illustrates a circuit diagram of a configuration of a DVS pixel of a DVS pixel array of FIG. 4.

FIG. 5 illustrates a circuit diagram of a configuration of a DVS pixel of a DVS pixel array of FIG. 4. The DVS pixel 1311 may include a photoreceptor 1313 and a DVS pixel back-end circuit 1315.

The photoreceptor 1313 may include a logarithmic amplifier LA and a feedback transistor FB. However, unlike a general DVS pixel, the photoreceptor 1313 may not include the photoelectric conversion device PSD. The photoelectric conversion device PSD illustrated in FIG. 5 may be a component of the CIS pixel 1211 (refer to FIG. 3). The logarithmic amplifier LA amplifies a voltage corresponding to the photocurrent IP that is generated by the photoelectric conversion device PSD of the DVS pixel 600. The logarithmic amplifier LA may output a log voltage VLOG of a log scale. The feedback transistor FB may separate the photoreceptor 1315 from a differentiator 1316 described below with respect to FIG. 6. The DVS pixel back-end circuit 1315 may perform various processing on the log voltage VLOG. In an embodiment, the DVS pixel back-end circuit 1315 may amplify the log voltage VLOG, compare the amplified voltage and a reference voltage to determine whether a light incident on the photoelectric conversion device PSD is a light, the intensity of which increases or decreases, and output an event signal (i.e., an on-event or off-event) corresponding to a result of the determination. After the DVS pixel back-end circuit 1315 outputs the on-event or the off-event, the DVS pixel back-end circuit 1315 may be reset by the reset signal RST.

Figure 6:
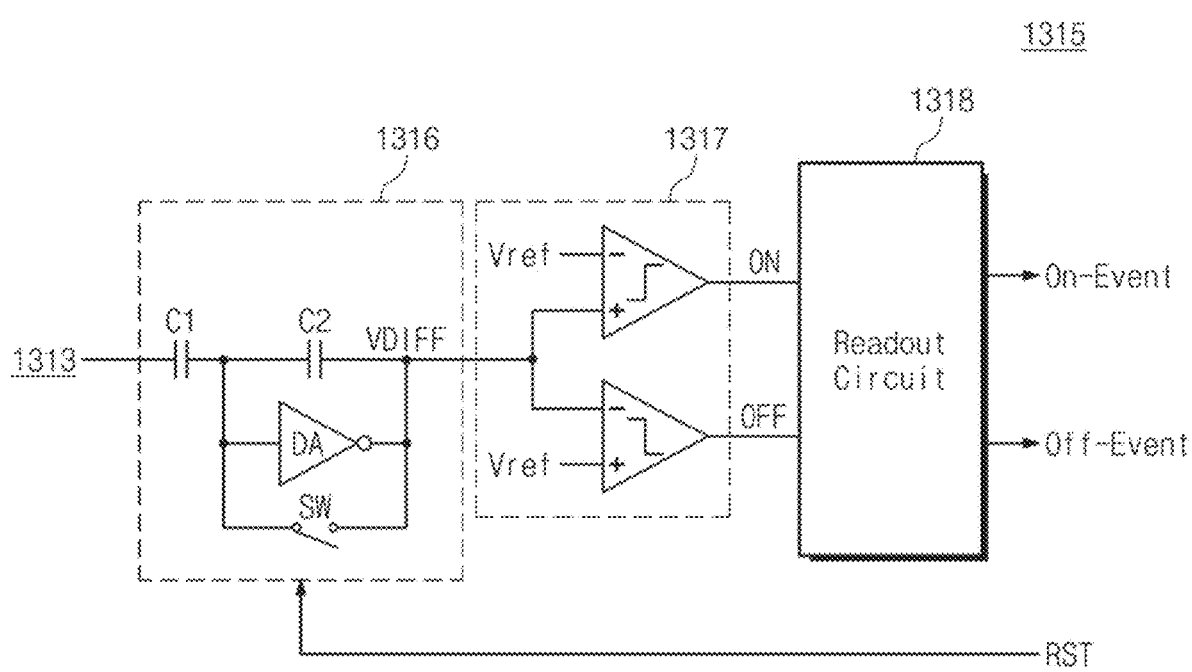
FIG. 6 illustrates a configuration of a DVS pixel back-end circuit of FIG. 5.

FIG. 6 illustrates a configuration of a DVS pixel back-end circuit of FIG. 5. The DVS pixel back-end circuit 1315 may include the differentiator 1316, a comparator 1317, and a readout circuit 1318.

The differentiator 1316 may amplify the voltage VLOG to generate a voltage VDIFF. For example, the differentiator 1316 may include capacitors C1 and C2, a differential amplifier DA, and a switch SW, and the switch SW may operate in response to the reset signal RST. For example, the capacitors C1 and C2 may store electrical energy generated by at least one photoelectric conversion device PSD. For example, capacitances of the capacitor C1 and C2 may be appropriately selected in consideration of the shortest time (e.g., a refractory period) between two events that are able to occur continuously at one pixel. When the switch SW is closed by the reset signal RST, a pixel may be initialized (or reset). The reset signal RST may be received from the row AER circuit 1330 (refer to FIG. 3).

The comparator 1317 may compare a level of the output voltage VDIFF of the differential amplifier DA and a level of a reference voltage Vref and may determine whether an event detected by a pixel is an on-event or an off-event. When the event that the intensity of light increases is detected, the comparator 1317 may output a signal ON indicating that the detected event is the on-event; when the event that the intensity of light decreases is detected, the comparator 1317 may output a signal OFF indicating that the detected event is the off-event.

The readout circuit 1318 may output information about the event that occurs at the pixel. The information about the event output from the readout circuit 1318 may include information (e.g., a bit) indicating whether the event that occurs is an on-event or an off-event. The information indicating the event output from the readout circuit 1318 may be called the "polarity information PoI" (refer to FIG. 4). The polarity information PoI may be provided to the row AER circuit 1330 (refer to FIG. 4).

Meanwhile, a configuration of a pixel illustrated in the embodiment of FIGS. 5 and 6 is exemplary, and the event detection may be applied to various configurations of DVS pixels configured to determine a type of an event based on a result of detecting the intensity of light.

Figure 7:
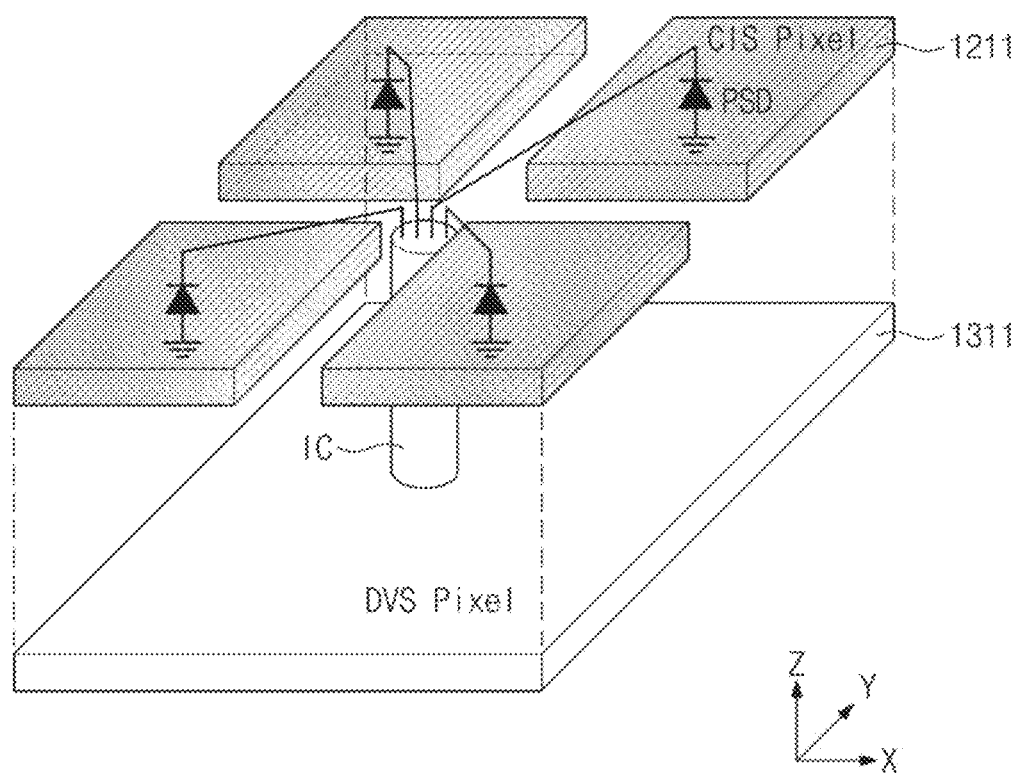
FIG. 7 illustrates CIS pixels and a DVS pixel sharing the photoelectric conversion device, according to an embodiment of the disclosure.

FIG. 7 illustrates CIS pixels and a DVS pixel sharing the photoelectric conversion device PSD, according to an embodiment of the disclosure.

In an embodiment, in a plan view (i.e., pixels are viewed in a Z-axis direction), four CIS pixels may correspond to one DVS pixel. The reason is that the size of the DVS pixel is larger than the size of the CIS pixel. However, the number of CIS pixels corresponding to one DVS pixel may vary depending on the sizes of the respective pixels, and is not limited to the ratio of FIG. 7.

The photoelectric conversion device PSD of each CIS pixel 1211 may be connected to the DVS pixel 1311 through an interconnector IC. In an embodiment, when the image sensor 1000 (refer to FIG. 1) operates in a DVS mode, the DVS pixel 1311 and only the photoelectric conversion device PSD of components of the CIS pixel 1211 may operate. Charges generated by the photoelectric conversion device PSD are transferred to the DVS pixel 1311 through the interconnector IC. In an embodiment, the interconnector IC may mean various configurations for electrically connecting the CIS pixel 1211 and the DVS pixel 1311. For example, the interconnector IC may include at least one of an electrical wiring, a wire, a solder ball, a bump, and a through silicon via (TSV).

Figure 8:
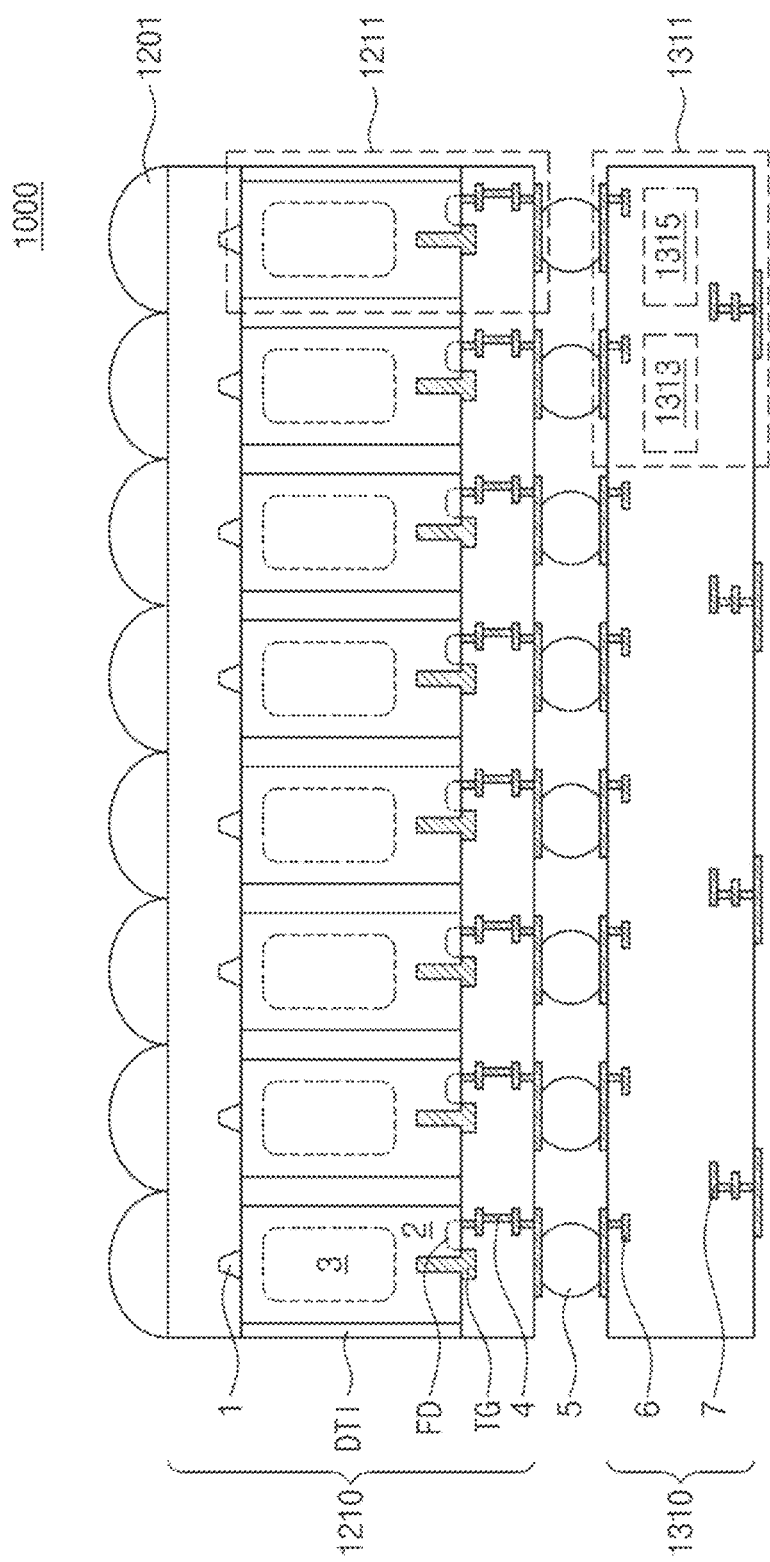
FIG. 8 illustrates a cross-sectional view of an image sensor according to an embodiment of the disclosure.

FIG. 8 illustrates a cross-sectional view of an image sensor according to an embodiment of the disclosure. The case where the image sensor 1000 operates in the DVS mode will be described with reference to FIGS. 3 and 5 together.

The image sensor 1000 includes the CIS pixel array 1210 including the CIS pixel 1211 and the DVS pixel array 1310 including the DVS pixel 1311. The lenses 1201 may be disposed on the CIS pixel array 1210. The CIS pixel array 1210 and the DVS pixel array 1310 may be formed on different substrates, respectively.

In an embodiment, a first substrate including the CIS pixel array 1210 and a second substrate including the DVS pixel array 1310 may be electrically connected through solder balls 5 in a flip-chip manner. Alternatively, the first substrate including the CIS pixel array 1210 and the second substrate including the DVS pixel array 1310 may be electrically connected through wires. Alternatively, the first substrate including the CIS pixel array 1210 and the second substrate including the DVS pixel array 1310 may be electrically connected through TSVs. Alternatively, the first substrate including the CIS pixel array 1210 and the second substrate including the DVS pixel array 1310 may be electrically connected through Cu-to-Cu bonding. However, the above couplings are exemplary, and the electrical connection is not limited to the above couplings.

The CIS pixel 1211 includes the photoelectric conversion device PSD that includes a first impurity-injected region 2 and a second impurity-injected region 3. The first impurity-injected region 2 and the second impurity-injected region 3 may be doped with different impurities. In an embodiment, the first impurity-injected region 2 may be doped with p-type impurities, and the second impurity-injected region 3 may be doped with n-type impurities. When a light is incident on the photoelectric conversion device PSD through the lens 1201, electron-hole pairs EHPs corresponding to the intensity of absorbed light are generated.

The CIS pixel 1211 includes the transfer transistor TG and the floating diffusion region FD, for example as described above regarding FIG. 3. The CIS pixel 1211 may further include the reset transistor RT, the drive transistor DT, and the select transistor ST, for example as also described above regarding FIG. 3. When the transfer transistor TG is turned on in response to the transfer signal VTG applied to a gate electrode of the transfer transistor TG, charges that are generated in the first impurity-injected region 2 and the second impurity-injected region 3 may move to the floating diffusion region FD. The charges of the floating diffusion region FD are transferred to the DVS pixel 1311 through internal wires 4, the solder ball 5, and internal wires 6.

The DVS pixel 1311 may include the photoreceptor 1313 and the DVS pixel back-end circuit 1315. In an embodiment, one DVS pixel 1311 may determine whether a detected event is an event that the intensity of light decreases or an event that the intensity of light increases, based on the charges received from a plurality of photoelectric conversion devices PSD. Information about the determined event may be output as a signal (e.g., to the image signal processor 1100 of FIG. 1, the CIS peripheral circuit, or the DVS peripheral circuit) through internal wires 7.

Meanwhile, an example is illustrated in FIG. 8 as the CIS pixel array 1210 and the DVS pixel array 1310 are directly electrically connected as an upper layer and a lower layer, but the configuration is not limited thereto. For example, at least one of the image signal processor 1100, the CIS peripheral circuit, and the DVS peripheral circuit may be interposed between the CIS pixel array 1210 and the DVS pixel array 1310. However, in any case, components (i.e., internal wires such as the internal wires 4, 5, and 6) for transferring charges of the floating diffusion region FD to the DVS pixel 1311 may be provided as in the configuration of FIG. 8.

As illustrated in FIG. 8, the size of the photoelectric conversion device PSD implemented with the first impurity-injected region 2 and the second impurity-injected region 3 is considerable, thus causing an increase in a chip size. However, according to an embodiment of the disclosure, the DVS pixel 1311 shares photoelectric conversion devices of the plurality of CIS pixels 1211. Therefore, because the DVS pixel 1311 does not implement an additional photoelectric conversion device, the size of an image sensor may be reduced, and manufacturing costs may decrease.

Figure 9:
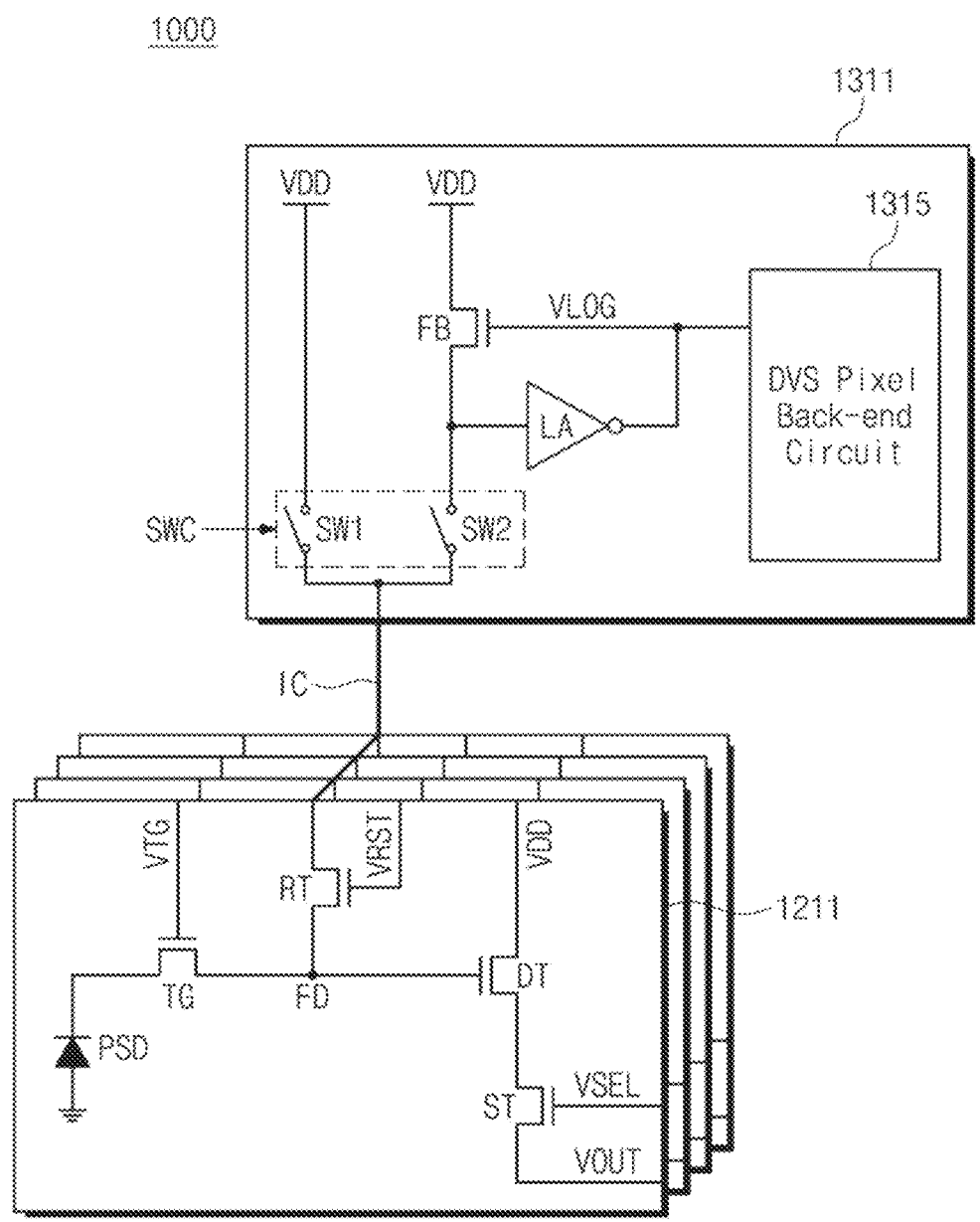
FIG. 9 illustrates a circuit diagram of an image sensor according to an embodiment of the disclosure.

FIG. 9 illustrates a circuit diagram of an image sensor according to an embodiment of the disclosure. The image sensor 1000 includes the CIS pixels 1211 and the DVS pixels 1311. In FIG. 9, four CIS pixels 1211 are connected in common to one DVS pixel 1311. However, as discussed above, a ratio of connections between CIS pixels and a DVS pixel may be differently provided according to sizes thereof.

The CIS pixel 1211 is configured to output the output voltage VOUT corresponding to charges accumulated in the floating diffusion region FD. The configuration and operation of the CIS pixel 1211 described with reference to FIG. 3. However, unlike FIG. 3, the floating diffusion region FD of the CIS pixel 1211 may be connected to the DVS pixel 1311 through the reset transistor RT. In detail, the floating diffusion region FD may be connected to a component(s) (e.g., SW1 and/or SW2) for changing an operating mode of the image sensor 1000 through the reset transistor RT. That is, depending on an operating mode corresponding to the open or closed states of switches SW1 and SW2, the CIS pixel 1211 may be selectively connected to the power supply voltage VDD or the feedback transistor FB.

The DVS pixel 1311 is configured to determine whether a detected event is an on-event or an off-event, through charges generated by the photoelectric conversion device PSD of the CIS pixel 1211. The configuration and operation of the DVS pixel 1311 are described with reference to FIG. 5. However, unlike the DVS pixel 1311 illustrated in FIGS. 5 and 6, the DVS pixel 1311 may further include components (e.g., a first switch SW1 and a second switch SW2) for changing an operating mode of the image sensor 1000. The first and second switches SW1 and SW2 may be controlled by a switch control signal SWC that is generated by the image signal processor 1100 or the row AER circuit 1330 (refer to FIG. 4).

In an embodiment, the first and second switches SW1 and SW2 may not be closed or opened at the same time within the same period. For example, in the case that the first switch SW1 is implemented with an NMOS transistor, the second switch SW2 may be implemented with a PMOS transistor (or vice versa). In this case, the first and second switches SW1 and SW2 may be controlled by one switch control signal SWC.

In an embodiment, the first and second switches SW1 and SW2 may be implemented with switches of the same type. For example, each of the first and second switches SW1 and SW2 may be implemented with an NMOS transistor. In this case, a component (e.g., an inverter) for inverting the switch control signal SWC may be further provided such that the first and second switches SW1 and SW2 are not closed or opened at the same time within the same period. For example, the switch control signal SWC may be applied to the first switch SW1, and an inverted switch control signal SWC may be applied to the second switch SW2.

In an embodiment, the first and second switches SW1 and SW2 may be implemented with switches of the same type. For example, control signals for controlling the first and second switches SW1 and SW2 may be applied to the first and second switches SW1 and SW2, respectively.

Meanwhile, the first and second switches SW1 and SW2 are exemplary. That is, in other embodiments, there may be adopted various components that selectively connect the CIS pixels 1211 to the power supply voltage VDD or the feedback transistor FB. In other embodiments, the first and second switches SW1 and SW2 may be provided external to the DVS pixel 1311 or may be provided within the CIS pixel 1211. That is, the configuration and layout of the first and second switches SW1 and SW2 illustrated in FIG. 9 are not intend to limit the configuration. The configuration and operation of the first and second switches SW1 and SW2 described above may be applied to embodiments described below.

Figure 10:
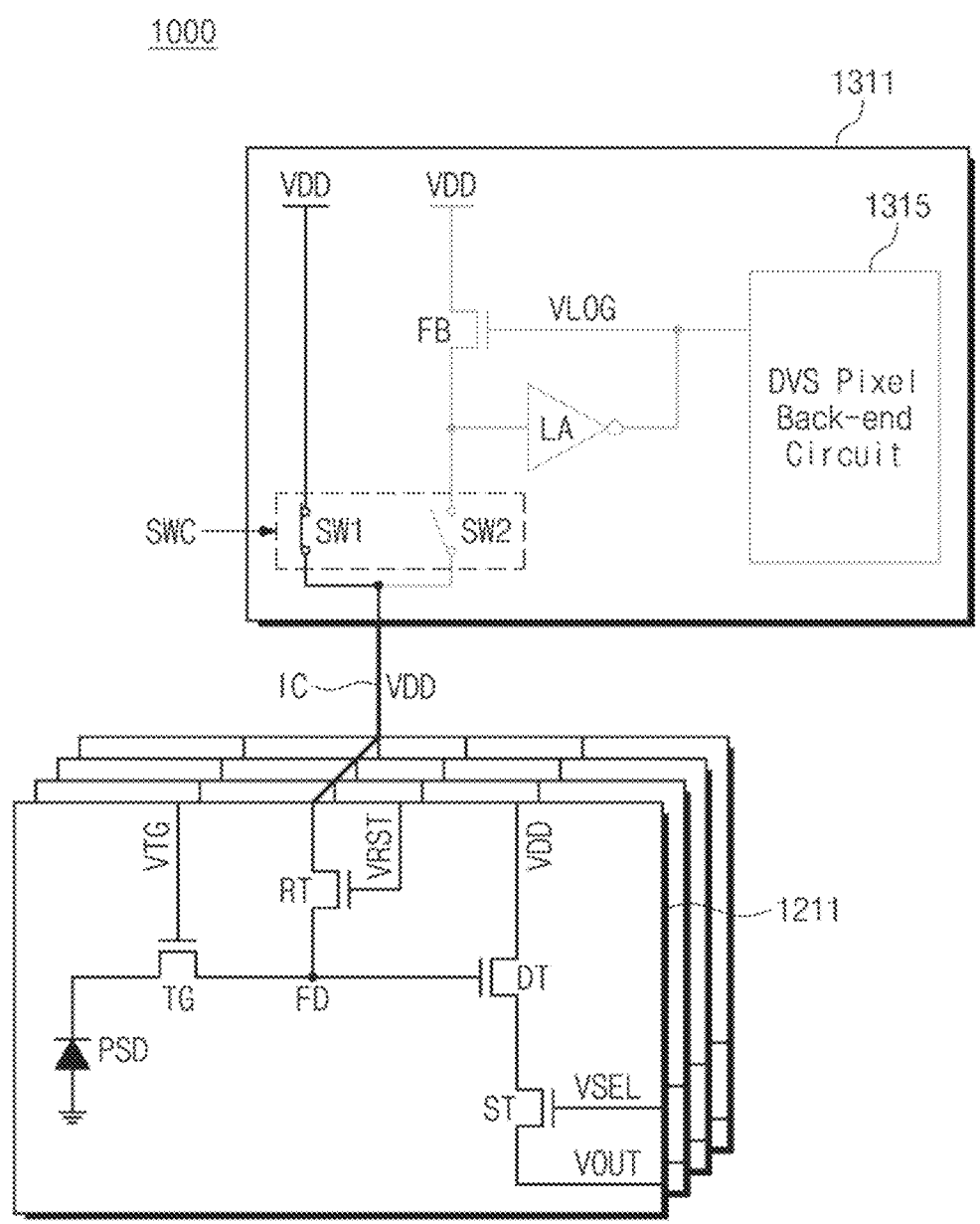
FIG. 10 is a diagram illustrating an image sensor of FIG. 9 operating in a first mode.

FIG. 10 is a diagram illustrating an image sensor of FIG. 9 operating in a first mode.

In the first mode, the image sensor 1000 may operate in a CIS mode. The first switch SW1 is closed by the switch control signal SWC, and the second switch SW2 is opened by the switch control signal SWC. In this case, the power supply voltage VDD is applied to a drain electrode of the reset transistor RT through the interconnector IC. In a period when the CIS pixel 1211 is reset, when the reset transistor RT is turned on by the reset signal VRST, the floating diffusion region FD may be reset to the power supply voltage VDD. Instead, in the first mode, the remaining components of the DVS pixel 1311 other than the first and second switches SW1 and SW2 do not operate.

Figure 11:
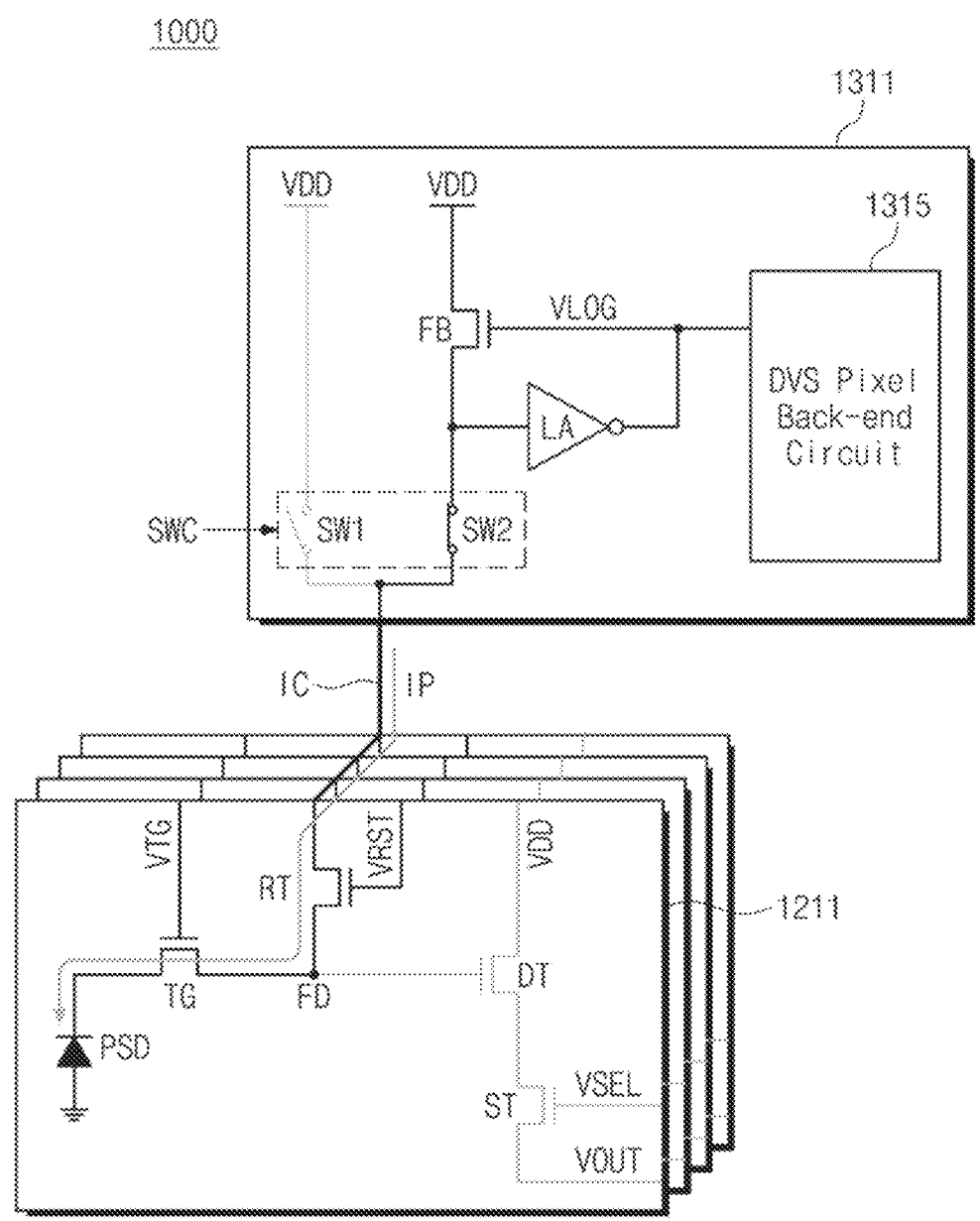
FIG. 11 is a diagram illustrating an image sensor of FIG. 9 operating in a second mode.

FIG. 11 is a diagram illustrating an image sensor of FIG. 9 operating in a second mode.

In the second mode, the image sensor 1000 may operate in the DVS mode. The first switch SW1 is opened by the switch control signal SWC, and the second switch SW2 is closed by the switch control signal SWC. When the transfer transistor TG is turned on, charges generated by the photoelectric conversion device PSD move to the floating diffusion region FD. When the reset transistor RT is turned on by the reset signal VRST, the charges accumulated in the floating diffusion region FD are input to the logarithmic amplifier LA. That is, in the second mode, the remaining components of the CIS pixel 1211 other than the photoelectric conversion device PSD, the transfer transistor TG, and the reset transistor RT do not operate. As the photocurrent IP is generated by the movement of the charges, the DVS pixel 1311 may operate.

Figure 12:
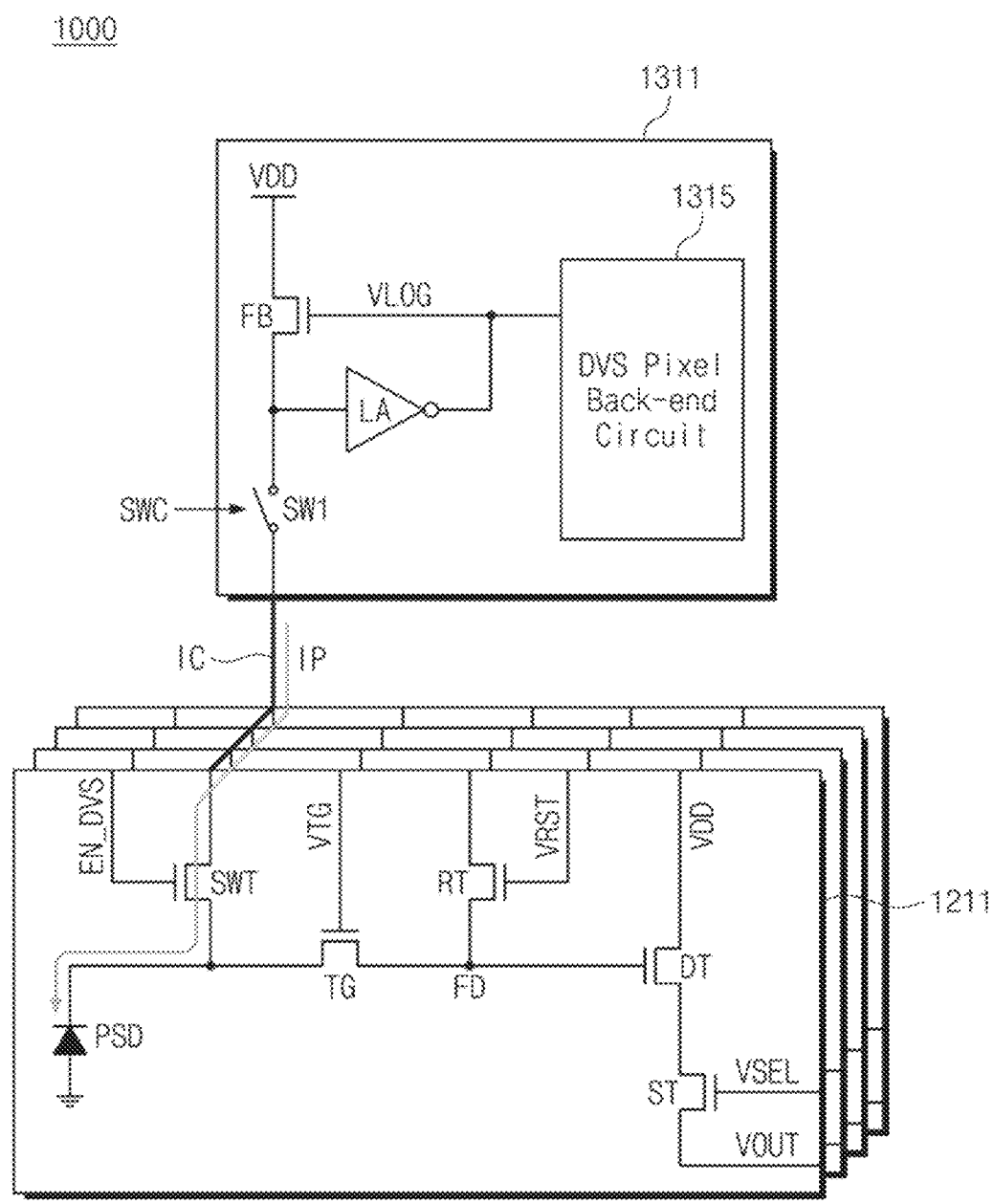
FIG. 12 illustrates a circuit diagram of an image sensor according to an embodiment of the disclosure.

FIG. 12 illustrates a circuit diagram of an image sensor according to an embodiment of the disclosure.

A configuration and an operation of the image sensor 1000 are similar to those described with reference to FIGS. 9 to 11. However, unlike the embodiments of FIGS. 9 to 11, the CIS pixel 1211 may further include a switch transistor SWT. The DVS pixel 1311 may include only the first switch SW1. In an embodiment, the image signal processor 1100 (refer to FIG. 1) or the row decoder 1220 (refer to FIG. 2) may generate a DVS enable signal EN_DVS for controlling the switch transistor SWT.

In the first mode, the image sensor 1000 may operate in the CIS mode. The switch transistor SWT is turned off by the DVS enable signal EN_DVS, and the remaining components of the CIS pixel 1211 operate as in a general CIS pixel. The DVS pixel 1311 does not operate.

In the second mode, the image sensor 1000 may operate in the DVS mode. The switch transistor SWT is turned on by the DVS enable signal EN_DVS. The remaining components of the CIS pixel 1211 other than the photoelectric conversion device PSD and the switch transistor SWT do not operate. The first switch SW1 is also closed by the switch control signal SWC. As charges generated by the photoelectric conversion device PSD move, the photocurrent IP is generated. As the photocurrent IP is input to the logarithmic amplifier LA, the DVS pixel 1311 may operate.

Figure 13:
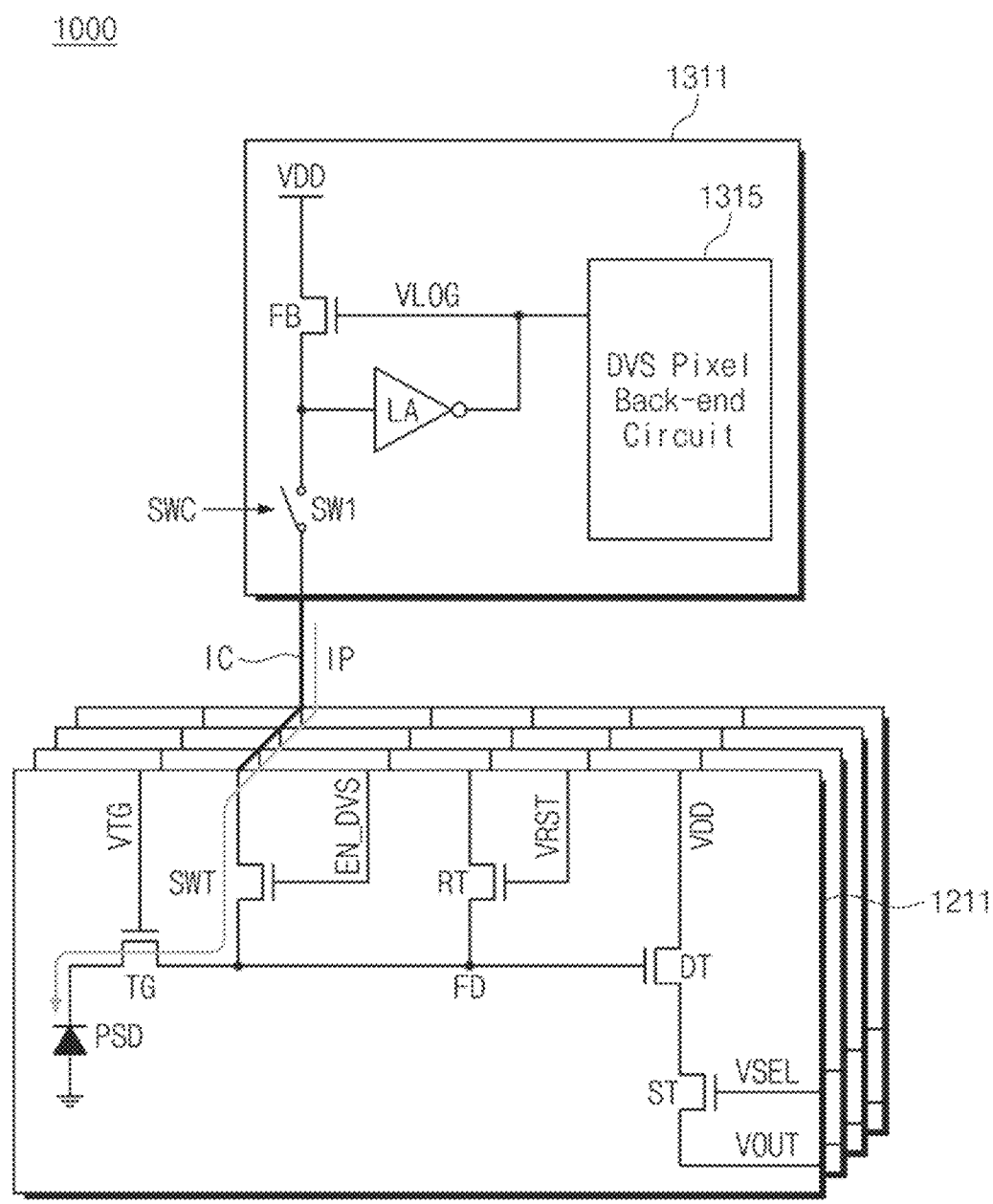
FIG. 13 illustrates a circuit diagram of an image sensor according to an embodiment of the disclosure.

FIG. 13 illustrates a circuit diagram of an image sensor according to an embodiment of the disclosure. The embodiment of FIG. 13 is similar to the embodiment of FIG. 12 in that the DVS pixel 1311 includes the first switch SW1 and the CIS pixel 1211 includes the switch transistor SWT. However, the switch transistor SWT may be connected to the floating diffusion region FD.

In the first mode, the image sensor 1000 may operate in the CIS mode. The switch transistor SWT is turned off by the DVS enable signal EN_DVS, and the remaining components of the CIS pixel 1211 operate as in a general CIS pixel. The DVS pixel 1311 does not operate. That is, in the first mode, the operation of the CIS pixel 1211 is the same as that of the embodiment of FIG. 12.

In the second mode, the image sensor 1000 may operate in the DVS mode. The switch transistor SWT is turned on by the DVS enable signal EN_DVS. The remaining components of the CIS pixel 1211 other than the photoelectric conversion device PSD, the transfer transistor TG, and the switch transistor SWT do not operate. That is, the embodiment of FIG. 13 is different from the embodiment of FIG. 12 in that the transfer transistor TG operates. The first switch SW1 is also turned on by the switch control signal SWC. As the photocurrent IP is generated by the movement of charges generated by the photoelectric conversion device PSD, the DVS pixel 1311 may operate.

Figure 14:
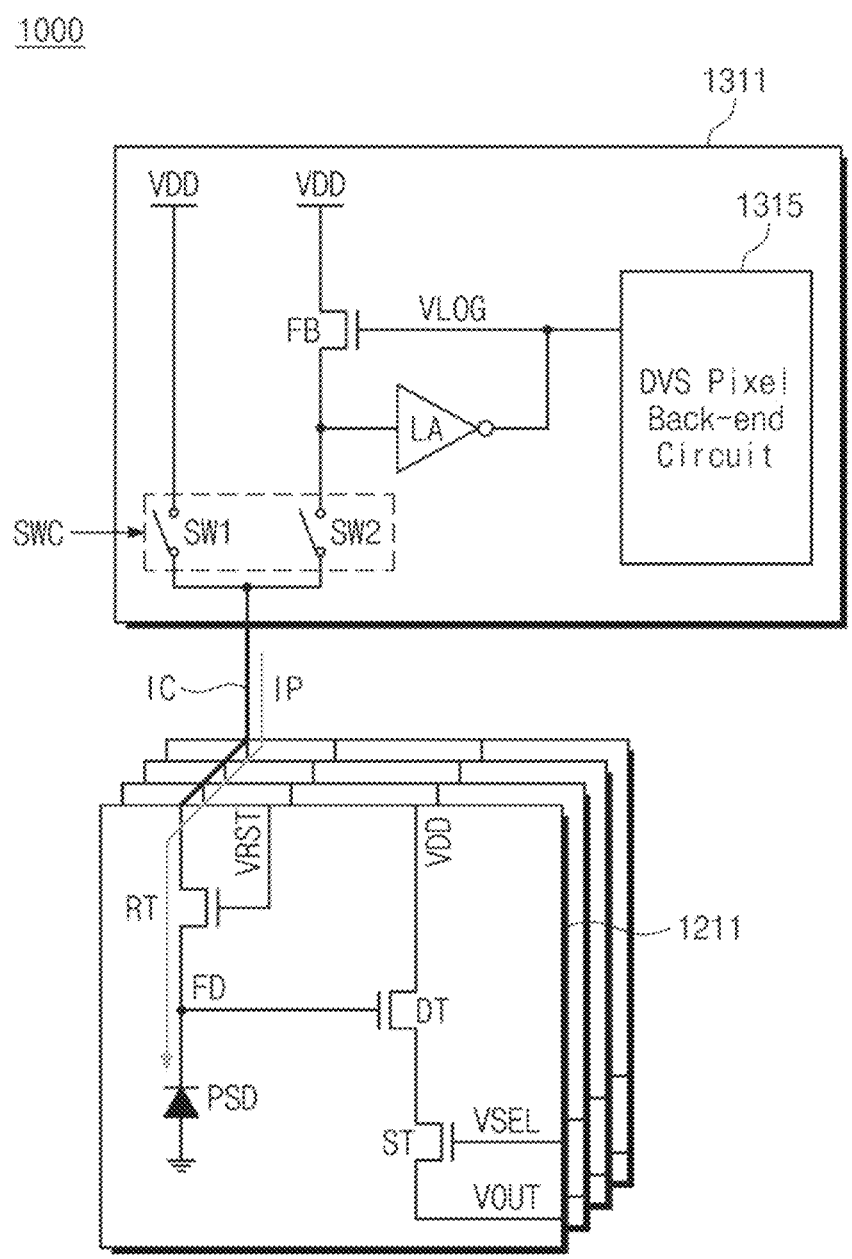
FIG. 14 illustrates a circuit diagram of an image sensor according to an embodiment of the disclosure.

FIG. 14 illustrates a circuit diagram of an image sensor according to an embodiment of the disclosure.

The CIS pixel 1211 may include the photoelectric conversion device PSD, the reset transistor RT, the drive transistor DT, and the select transistor ST. That is, unlike the above embodiments, the CIS pixel 1211 includes three transistors and does not include a transfer transistor (e.g., TG of FIG. 9).

In the first mode, the image sensor 1000 may operate in the CIS mode. The first switch SW1 is closed by the switch control signal SWC, and the second switch SW2 is opened by the switch control signal SWC. Charges generated by the photoelectric conversion device PSD may be directly transferred to the floating diffusion region FD. A process in which the output voltage VOUT corresponding to charges of the floating diffusion region FD is output when the select transistor ST is turned on by the select signal VSEL is similar to that described with reference to the embodiment of FIG. 3.

In the second mode, the image sensor 1000 may operate in the DVS mode. The first switch SW1 is opened by the switch control signal SWC, and the second switch SW2 is closed by the switch control signal SWC. The reset transistor RT is turned on by the reset signal VRST. As the photocurrent IP is generated by the movement of charges generated by the photoelectric conversion device PSD, the DVS pixel 1311 may operate.

Figure 15:
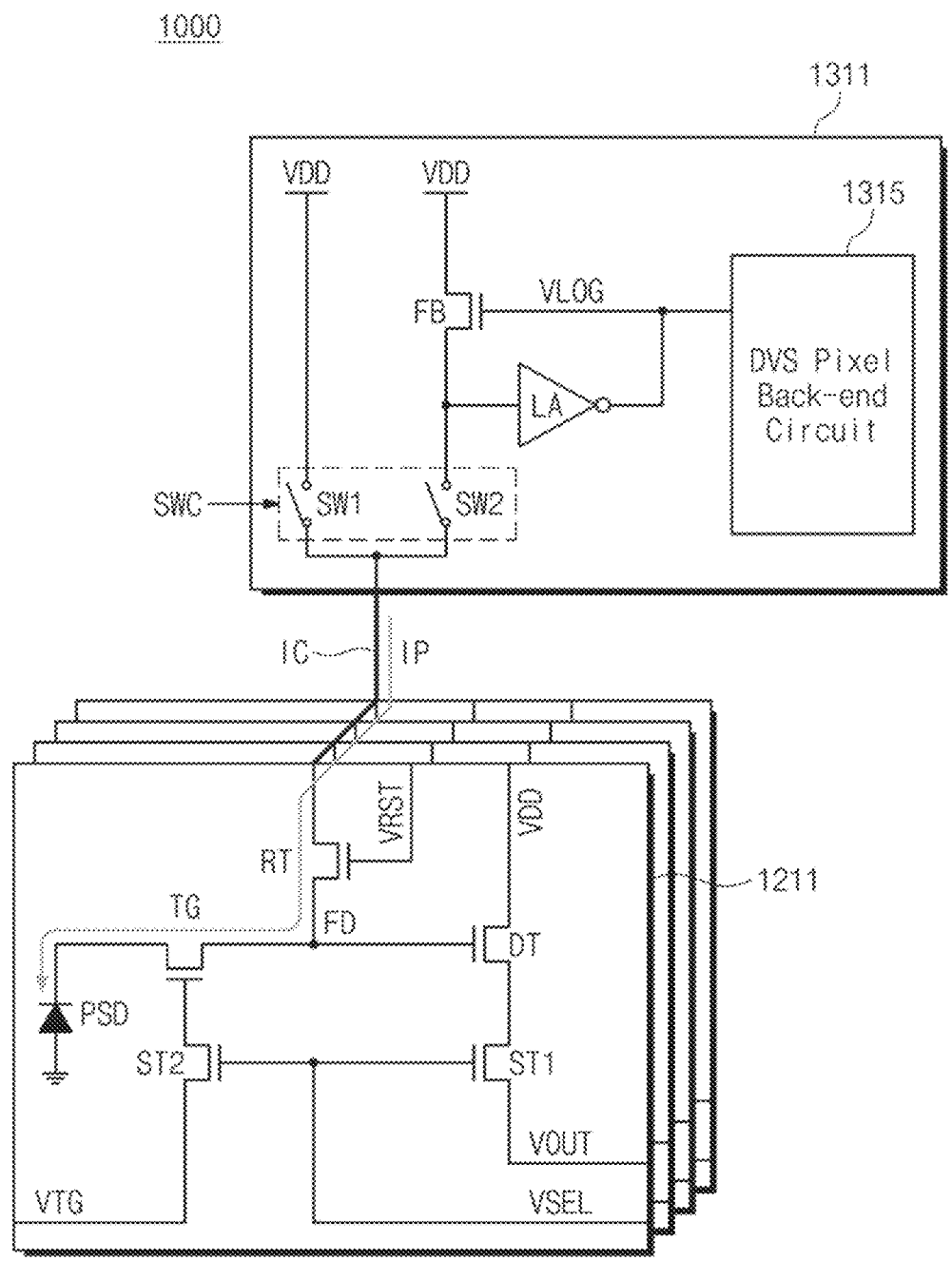
FIG. 15 illustrates a circuit diagram of an image sensor according to an embodiment of the disclosure.

FIG. 15 illustrates a circuit diagram of an image sensor according to an embodiment of the disclosure.

The CIS pixel 1211 may include the photoelectric conversion device PSD, the transfer transistor TG, the reset transistor RT, the drive transistor DT, a first select transistor ST1, and a second select transistor ST2. That is, the CIS pixel 1211 may have a five transistor (5TR) structure. The second select transistor ST2 is turned on by the select signal VSEL and transfers the transfer signal VTG to a gate electrode of the transfer transistor TG. Gate electrodes of the first and second select transistors ST1 and ST2 may be interconnected to receive the select signal VSEL.

In the first mode, the image sensor 1000 may operate in the CIS mode. The first switch SW1 is closed by the switch control signal SWC, and the second switch SW2 is opened by the switch control signal SWC. To transfer charges generated by the photoelectric conversion device PSD to the floating diffusion region FD, the select signal VSEL may be applied to the first and second select transistors ST1 and ST2. When the second select transistor ST2 is turned on, the transfer signal VTG is applied to the transfer transistor TG, and the transfer transistor TG is turned on. In this case, the charges are transferred to the floating diffusion region FD. The operation of the CIS pixel 1211 is similar to that described with reference to the embodiment of FIGS. 9 to 11 except that the second select transistor ST2 is added.

In the second mode, the image sensor 1000 may operate in the DVS mode. The second select transistor ST2 is turned on by the select signal VSEL. As the transfer signal VTG is applied to the gate electrode of the transfer transistor TG, the transfer transistor TG is turned on. The reset transistor RT is turned on by the reset signal VRST. The first switch SW1 is opened by the switch control signal SWC, and the second switch SW2 is closed by the switch control signal SWC. As the photocurrent IP is generated by the movement of charges generated by the photoelectric conversion device PSD, the DVS pixel 1311 may operate based on the photocurrent IP.

Figure 16:
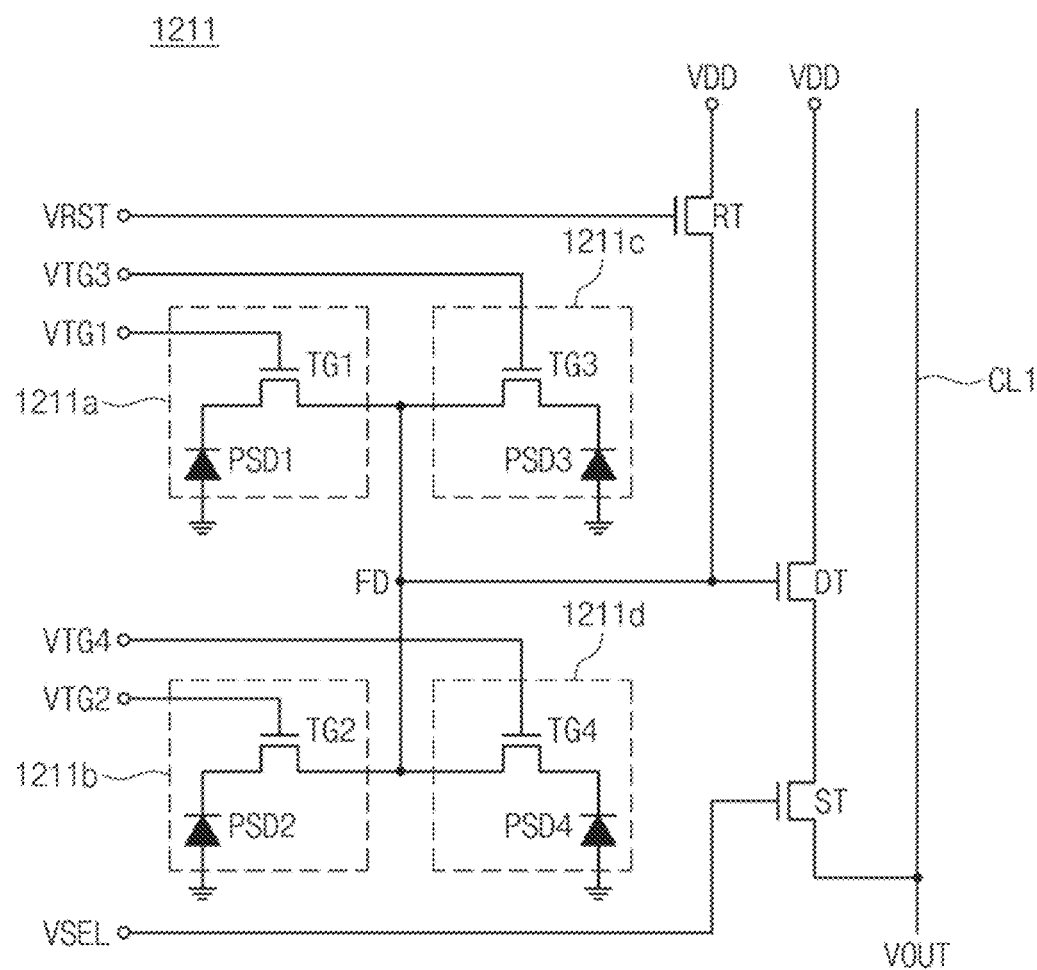
FIG. 16 illustrates a circuit diagram of a configuration of a CIS pixel of FIG. 2.

FIG. 16 illustrates a circuit diagram of a configuration of a CIS pixel of FIG. 2.

The CIS pixel 1211 may include photoelectric conversion devices PSD1 to PSD4, transfer transistors TG1 to TG4, the reset transistor RT, the drive transistor DT, and the select transistor ST. The first photoelectric conversion device PSD1, the first transfer transistor TG1, the reset transistor RT, the drive transistor DT, and the select transistor ST may constitute a first sub-CIS pixel 1211a. An example is illustrated in FIG. 16 as the first sub-CIS pixel 1211a surrounds only the first photoelectric conversion device PSD1 and the first transfer transistor TG1, but this is for brevity of illustration. As in the above description, the second photoelectric conversion device PSD2, the second transfer transistor TG2, the reset transistor RT, the drive transistor DT, and the select transistor ST may constitute a second sub-CIS pixel 1211b. Configurations of a third sub-CIS pixel 1211c and a fourth sub-CIS pixel 1211d are the same as the above-described configuration.

The first to fourth sub-CIS pixels 1211a to 1211d may share the floating diffusion region FD. In an embodiment, the first sub-CIS pixel 1211a may include a green filter, the second sub-CIS pixel 1211b may include a blue filter, the third sub-CIS pixel 1211c may include a red filter, and the fourth sub-CIS pixel 1211d may include a green filter. The red filter may transmit a light in a red wavelength band, the green filter may transmit a light in a green wavelength band, and the blue filter may transmit a light in a blue wavelength band.

In an embodiment, the first to fourth sub-CIS pixels 1211a to 1211d may sequentially operate. For example, in an operation of the first sub-CIS pixel 1211a, when the first transfer transistor TG1 is turned on by a first transfer signal VTG1, charges generated by the first photoelectric conversion device PSD1 are transferred to the floating diffusion region FD. When the select transistor ST is turned on by the select signal VSEL, the output voltage VOUT corresponding to the charges of the floating diffusion region FD is output. When the reset transistor RT is turned on by the reset signal VRST, the floating diffusion region FD is reset.

After the operation of the first sub-CIS pixel 1211a, the second sub-CIS pixel 1211b may operate to be similar to the first sub-CIS pixel 1211a. The third sub-CIS pixel 1211c and the fourth sub-CIS pixel 1211d may operate to be similar to the first sub-CIS pixel 1211a.

However, the layout of color filters in a pixel group, the number of CIS pixels connected in common to the floating diffusion region FD, a configuration of the pixel group, and an operation of the pixel group are exemplary. The configuration is not limited thereto. For example, the configuration may be applied to CIS image sensors of various configurations in which a plurality of photoelectric conversion devices share the floating diffusion region FD.

Figure 17:
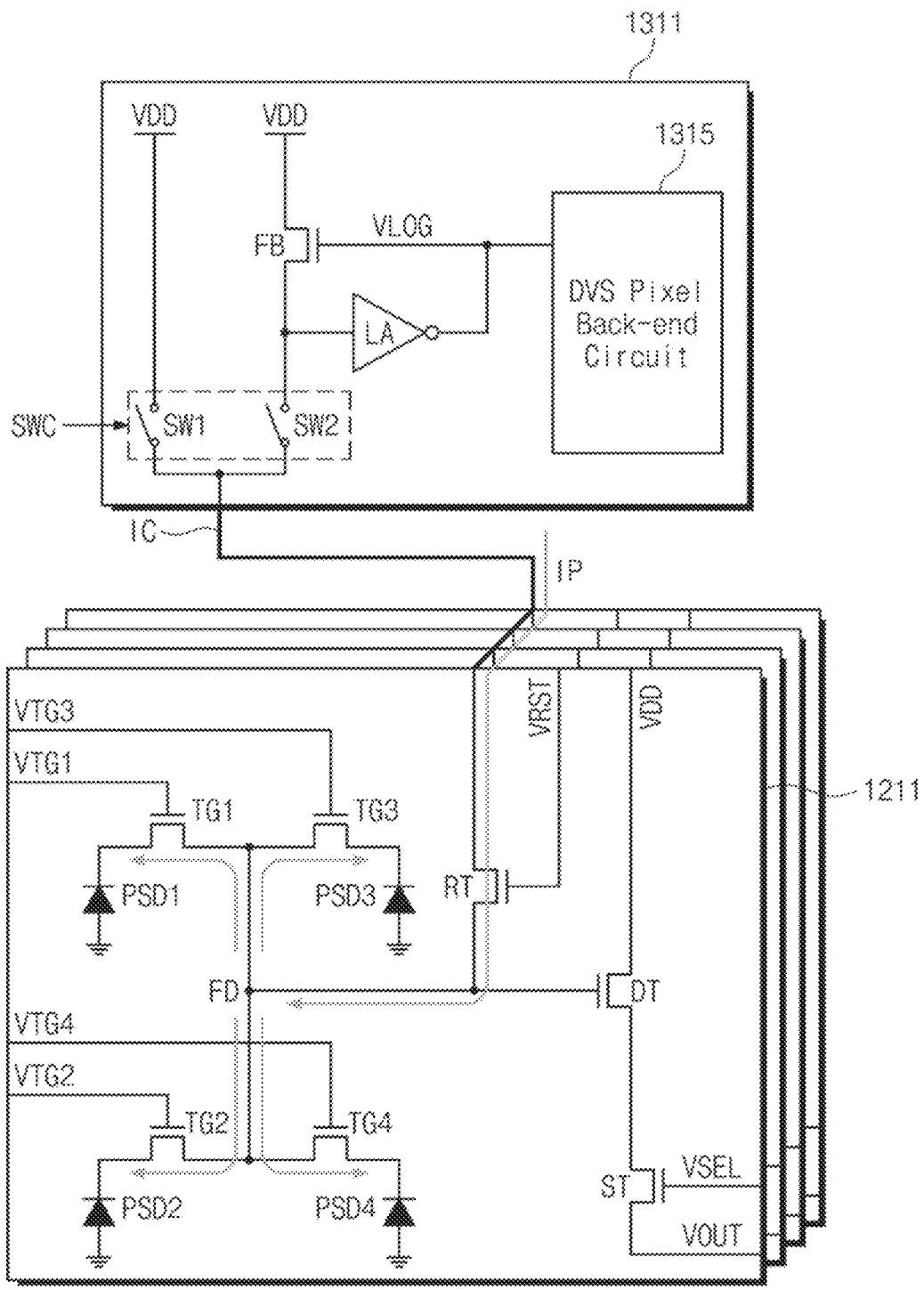
FIG. 17 illustrates a circuit diagram of an image sensor according to an embodiment of the disclosure.

FIG. 17 illustrates a circuit diagram of an image sensor according to an embodiment of the disclosure.

The CIS pixel 1211 illustrated in FIG. 17 is substantially the same as the CIS pixel 1211 of FIG. 16. Therefore, components of FIG. 17 may be called the first, second, third, and fourth sub-CIS pixels 1211a, 1211b, 1211c, and 1211d like the components of FIG. 16. For example, the first photoelectric conversion device PSD1, the first transfer transistor TG1, the reset transistor RT, the drive transistor DT, and the select transistor ST are called the "first sub-CIS pixel 1211a." The second to fourth sub-CIS pixels 1211b to 1211d are also similar to the above description. For clarity of illustration, the reference numerals 1211a, 1211b, 1211c, and 1211d illustrated in FIG. 16 are omitted.

In the first mode, the image sensor 1000 may operate in the CIS mode. The first switch SW1 is closed by the switch control signal SWC, and the second switch SW2 is opened by the switch control signal SWC. The operations of sub-CIS pixels constituting the CIS pixel 1211 in the CIS mode are described with reference to FIG. 16, and thus, redundant description is omitted.

In the second mode, the image sensor 1000 may operate in the DVS mode. The transfer transistors TG1 to TG4 are turned on in response to the transfer signals VTG1 to VTG4 applied to gate electrodes of the transfer transistors TG1 to TG4. The reset transistor RT is turned on by the reset signal VRST. The first switch SW1 is opened by the switch control signal SWC, and the second switch SW2 is closed by the switch control signal SWC. As the photocurrent IP is generated by the movement of charges generated by the photoelectric conversion devices PSD1 to PSD4, the DVS pixel 1311 may operate based on the photocurrent IP.

In an embodiment, only a part of the transfer transistors TG1 to TG4 may be turned on to adjust the sensitivity (or the intensity) of received light. Unlike the above embodiments, in the embodiment of FIG. 17, 16 CIS pixels may be connected to one DVS pixel. Therefore, only a portion of the 16 transfer transistors may be turned on to adjust the sensitivity (or the intensity) of received light or to reduce power consumption of the image sensor 1000.

Figure 18:
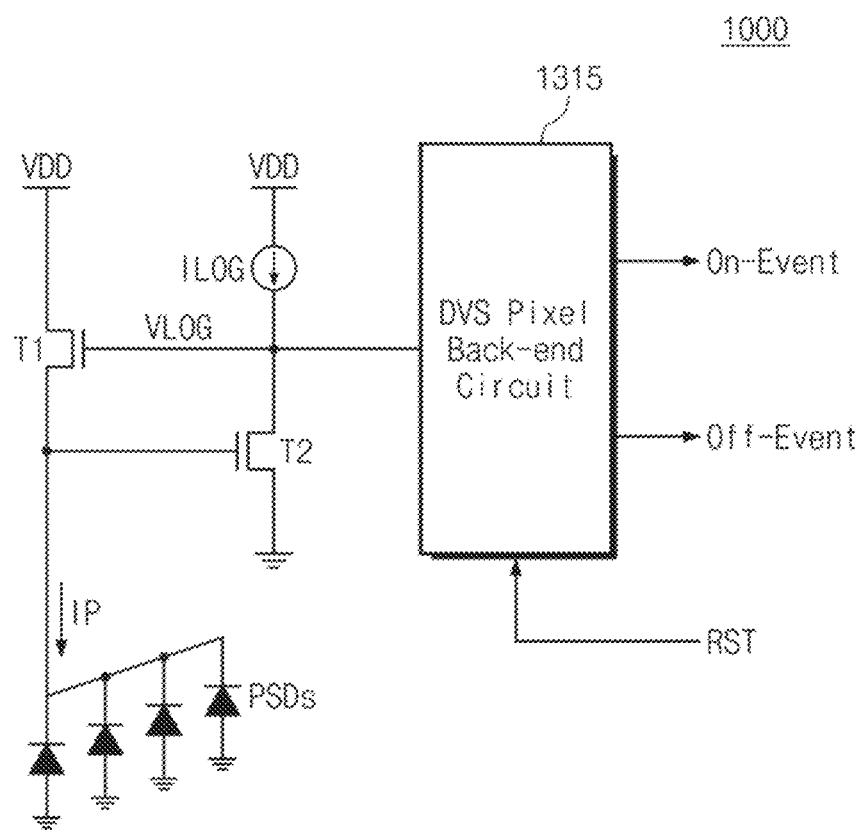
FIG. 18 illustrates a circuit diagram of an image sensor according to an embodiment of the disclosure.

FIG. 18 illustrates an image sensor according to an embodiment of the disclosure.

The image sensor 1000 includes a plurality of photoelectric conversion devices PSD, a first transistor T1, a second transistor T2, a log current source ILOG, and the DVS pixel back-end circuit 1315. In an embodiment, FIG. 18 shows only components associated with generating an event signal from among all components of an image sensor. That is, the components illustrated in FIG. 18 correspond to components operating in the DVS mode from among the components of the image sensor, and some components of a CIS pixel are not illustrated.

Below, operations of the illustrated components will be described. The second transistor T2 may be turned on by the photocurrent IP generated by charges of the photoelectric conversion devices PSDs. The first transistor T1 may be turned on by the log voltage VLOG that is based on the log current source ILOG. Here, a magnitude of the log voltage VLOG may have a value of a log scale. For example, a node from which a current of the log current source ILOG is output is called a "log voltage node."

In an embodiment, the log current source ILOG may be a component of a DVS pixel. The first and second transistors T1 and T2 and the photoelectric conversion devices PSD may be components of a CIS pixel. According to the embodiment of FIG. 18, the DVS pixel may not include any other components (e.g., the first and second transistors T1 and T2) as well as the photoelectric conversion device PSD. Therefore, the size of the general DVS pixel may be further reduced. Below, a structure of an image sensor in which the DVS pixel shares some components of the CIS pixel will be described with reference to FIG. 19.

Figure 19:
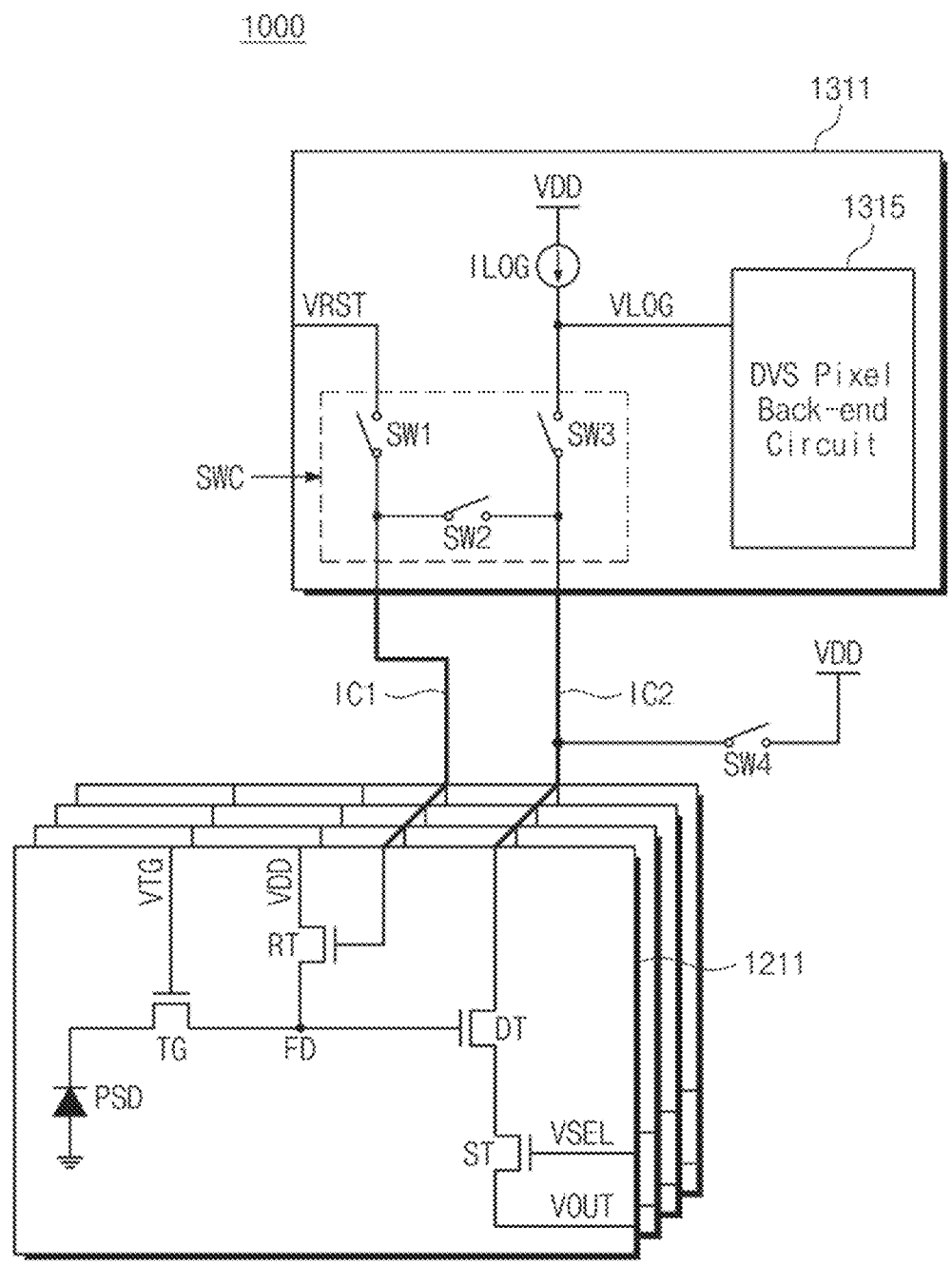
FIG. 19 illustrates a circuit diagram of an image sensor according to an embodiment of the disclosure.

FIG. 19 illustrates a circuit diagram of an image sensor according to an embodiment of the disclosure. In an embodiment, FIG. 19 shows the image sensor 1000 for implementing a circuit structure of FIG. 18. The image sensor 1000 includes the CIS pixels 1211 and the DVS pixels 1311. An embodiment is illustrated in FIG. 19 as four CIS pixels 1211 are connected in common to one DVS pixel 1311.

The CIS pixel 1211 is configured to output the output voltage VOUT corresponding to charges accumulated in the floating diffusion region FD. A configuration and an operation of the CIS pixel 1211 are substantially the same as those described with reference to FIG. 9. However, there may be a difference in connection between the CIS pixel 1211 and the DVS pixel 1311. In detail, a gate electrode of the reset transistor RT may be connected to a component(s) (e.g., SW1 and/or SW2) for changing an operating mode of the image sensor 1000 through a first interconnector IC1. In detail, one end of the drive transistor DT may be connected to a component(s) (e.g., SW2 and/or switch SW3) for changing the operating mode of the image sensor 1000 through a second interconnector IC2.

The DVS pixel 1311 is configured to determine whether a detected event is an on-event or an off-event, through charges generated by the photoelectric conversion device PSD of the CIS pixel 1211. However, the DVS pixel 1311 according to the above embodiments does not include the photoelectric conversion device PSD; in addition, the DVS pixel 1311 according to the embodiment of FIG. 19 does not include transistors (e.g., T1 and T2 of FIG. 18). Instead, the DVS pixel 1311 may further include components (e.g., the first to third switches SW1 to SW3) for changing the operating mode of the image sensor 1000. The first to third switches SW1 to SW3 may be controlled by that switch control signal SWC that the image signal processor 1100 or the row AER circuit 1330 (refer to FIG. 4) generates.

Meanwhile, the image sensor 1000 may include a fourth switch SW4 for selectively providing the power supply voltage VDD that is to be applied to the drive transistor DT in the CIS mode. For example, the fourth switch SW4 may be connected to the second interconnector IC2 and may selectively provide the power supply voltage VDD to the drive transistor DT. For example, the first to fourth switches SW1 to SW4 may be called a "switching circuit."

Figure 20:
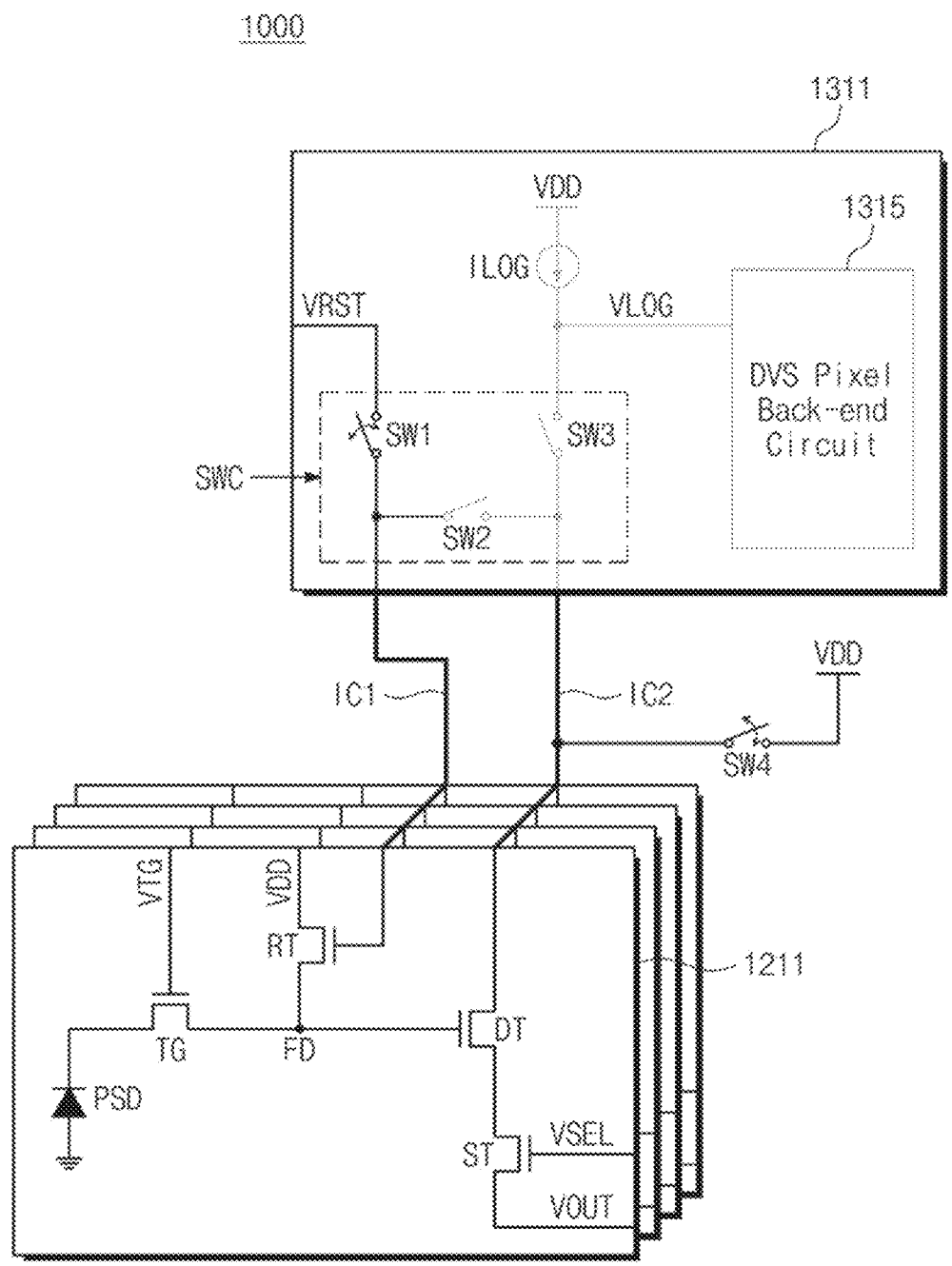
FIG. 20 is a diagram illustrating an image sensor of FIG. 19 operating in a first mode.

FIG. 20 is a diagram illustrating an image sensor of FIG. 19 operating in a first mode.

In the first mode, the image sensor 1000 may operate in the CIS mode. The first switch SW1 may be closed or opened by the switch control signal SWC. In detail, the first switch SW1 may be closed to reset the floating diffusion region FD. The second and third switches SW2 and SW3 are opened. In this case, the fourth switch SW4 may be closed.

Figure 21:
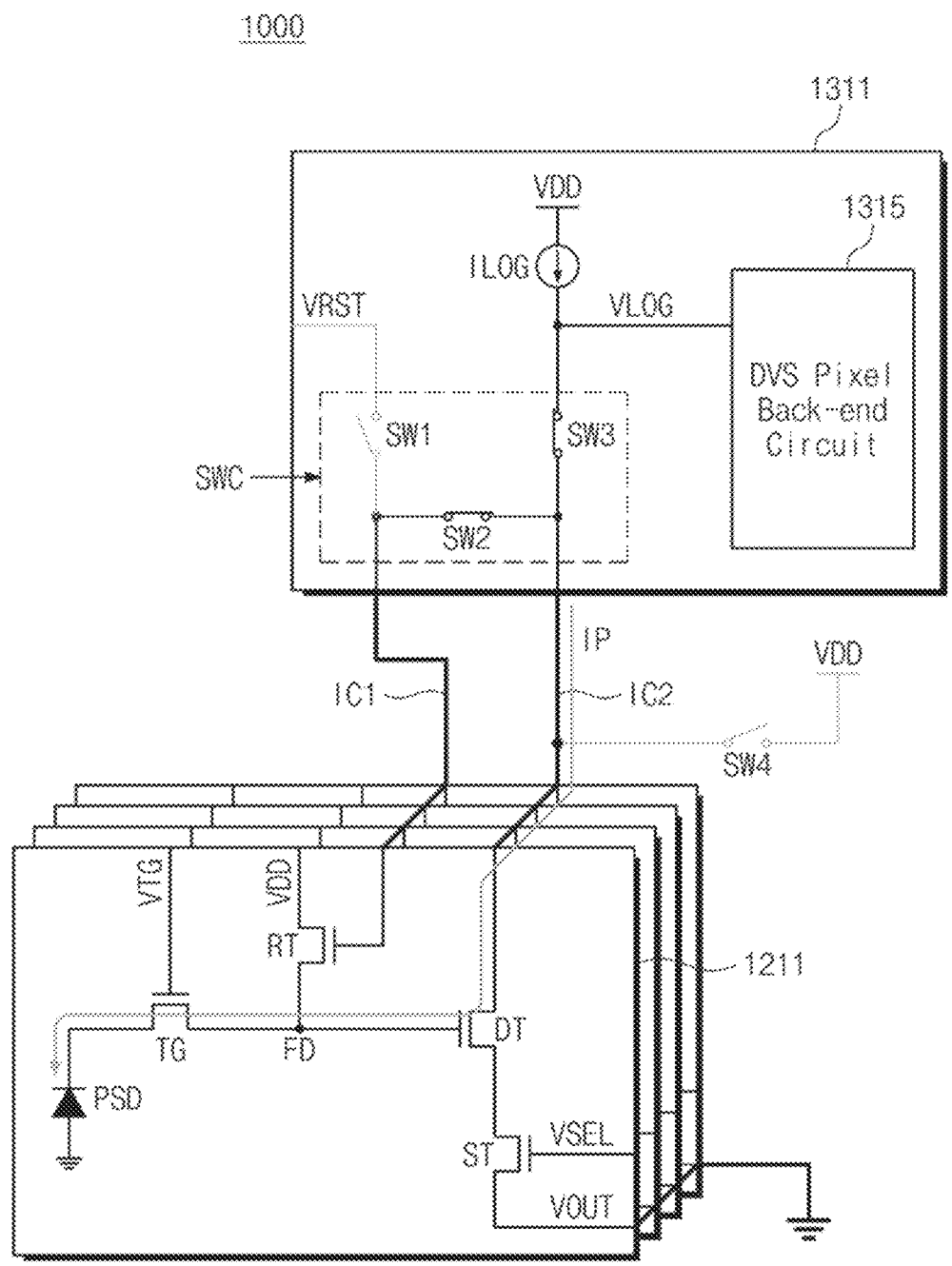
FIG. 21 is a diagram illustrating an image sensor of FIG. 19 operating in a second mode.

FIG. 21 is a diagram illustrating an image sensor of FIG. 19 operating in a second mode.

In the second mode, the image sensor 1000 may operate in the DVS mode. The first and fourth switches SW1 and SW4 are opened by the switch control signal SWC, and the second and third switches SW2 and SW3 are closed by the switch control signal SWC. That is, a gate electrode of the reset transistor RT and a drain electrode of the drive transistor DT may be connected to the log voltage node. The transfer transistor TG is turned on by the transfer signal VTG.

A source electrode of the select transistor ST from which the output voltage VOUT is output may be grounded. Although not illustrated for clarity of illustration, there may be included a component (e.g., a switch) for selectively connecting the source electrode of the select transistor ST to a ground terminal or a column line (e.g., CL1 of FIG. 3).

Compared the circuit diagram corresponding to a switching state of FIG. 21 with the circuit diagram of FIG. 18, it may be understood that the image sensor 1000 of FIG. 18 and the image sensor 1000 of FIG. 21 are similar. That is, the first transistor T1 and the second transistor T2 of FIG. 18 correspond to the reset transistor RT and the drive transistor DT of FIG. 22, respectively.

Figure 22:
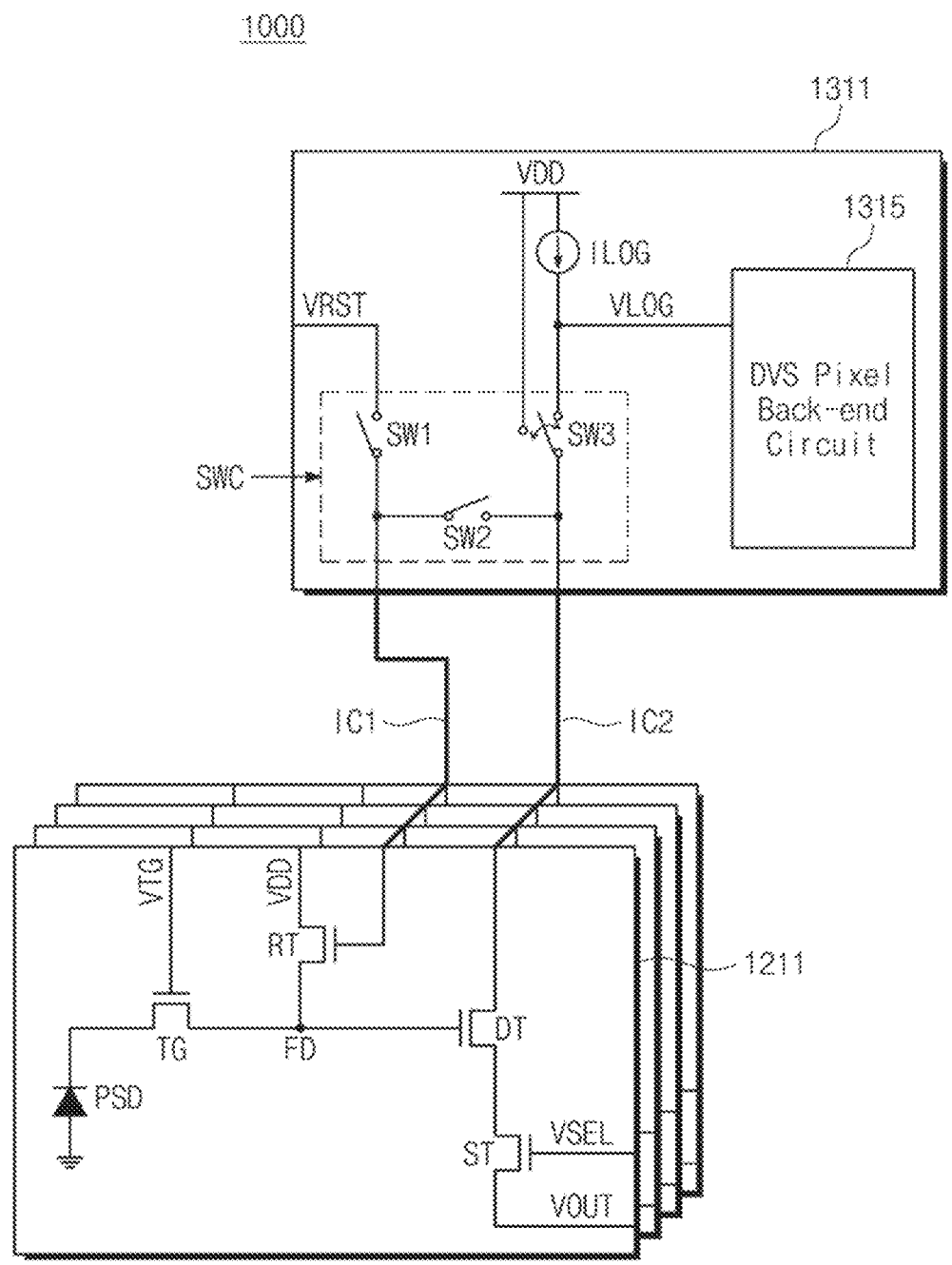
FIG. 22 illustrates a circuit diagram of an image sensor according to an embodiment of the disclosure.

FIG. 22 illustrates a circuit diagram of an image sensor according to an embodiment of the disclosure.

The embodiment of FIG. 22 is similar to the embodiments of FIGS. 19 to 21. However, compared with the embodiment of FIGS. 19 to 21, the embodiment of FIG. 22 may have a difference in the configuration and layout of the switches SW1 to SW3. In an embodiment, the third switch SW3 may be selectively connected to the power supply voltage VDD or the log current source ILOG depending on an operating mode. For example, the third switch SW3 may be connected to the power supply voltage VDD in the first mode and may be connected to the log current source ILOG in the second mode.

However, a configuration for applying the reset signal VRST to a gate electrode of the reset transistor RT in the first mode, applying the power supply voltage VDD to the drive transistor DT, connecting the log current source ILOG to the drive transistor DT and a gate electrode of the reset transistor RT in the second mode is not limited thereto. That is, various switch configurations for implementing the circuit structure of FIG. 18 may be adopted in addition to the embodiments of FIGS. 19 to 22.

Figure 23:
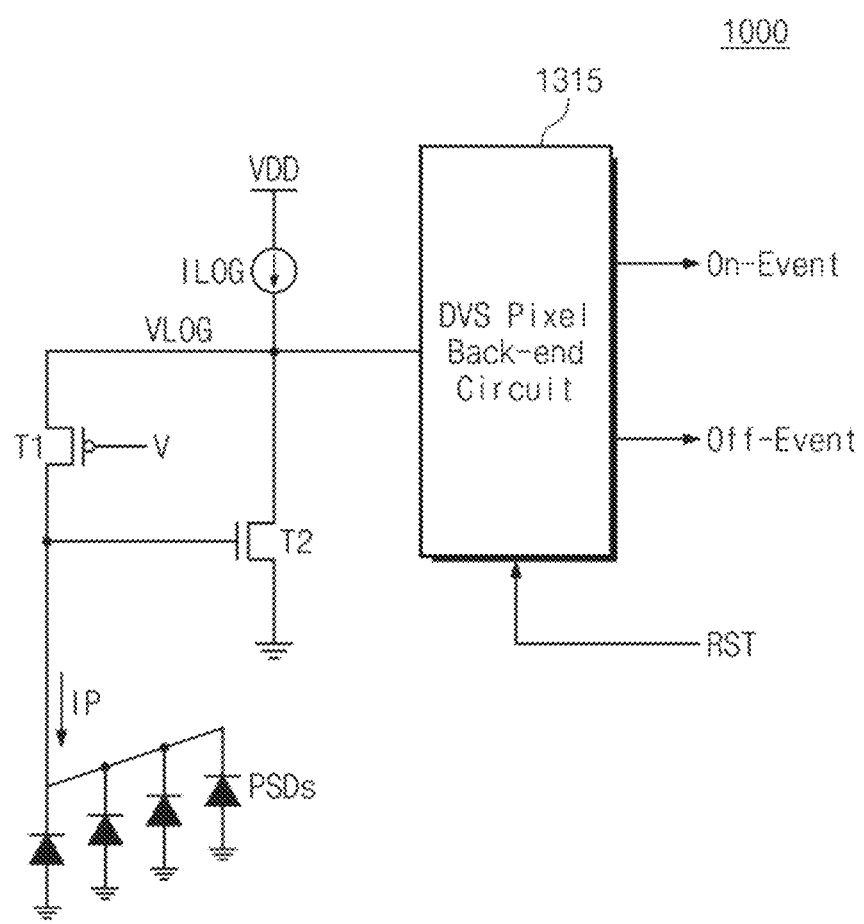
FIG. 23 illustrates a circuit diagram of an image sensor according to an embodiment of the disclosure.

FIG. 23 illustrates an image sensor according to an embodiment of the disclosure.

The image sensor 1000 includes the plurality of photoelectric conversion devices PSD, the first transistor T1, the second transistor T2, the log current source ILOG, and the DVS pixel back-end circuit 1315. In an embodiment, FIG. 23 shows only components associated with generating an event signal from among all components of an image sensor. That is, the components illustrated in FIG. 23 correspond to components operating in the DVS mode from among the components of the image sensor, and some components of a CIS pixel are not illustrated.

The circuit diagram of FIG. 23 is similar to the circuit diagram of FIG. 18. However, the first transistor T1 may be replaced with a PMOS transistor, and one end of the first transistor T1 is connected to the log voltage node from which a current of the log voltage VLOG is output. The log current source ILOG may be a component of a DVS pixel, and the first and second transistors T1 and T2 and the photoelectric conversion devices PSD may be components of a CIS pixel. The second transistor T2 may be turned on by the photocurrent IP generated by charges that the photoelectric conversion devices PSD generate. The first transistor T1 may be turned on by a separate voltage "V." The log voltage node may have a voltage value of a log scale.

Figure 24:
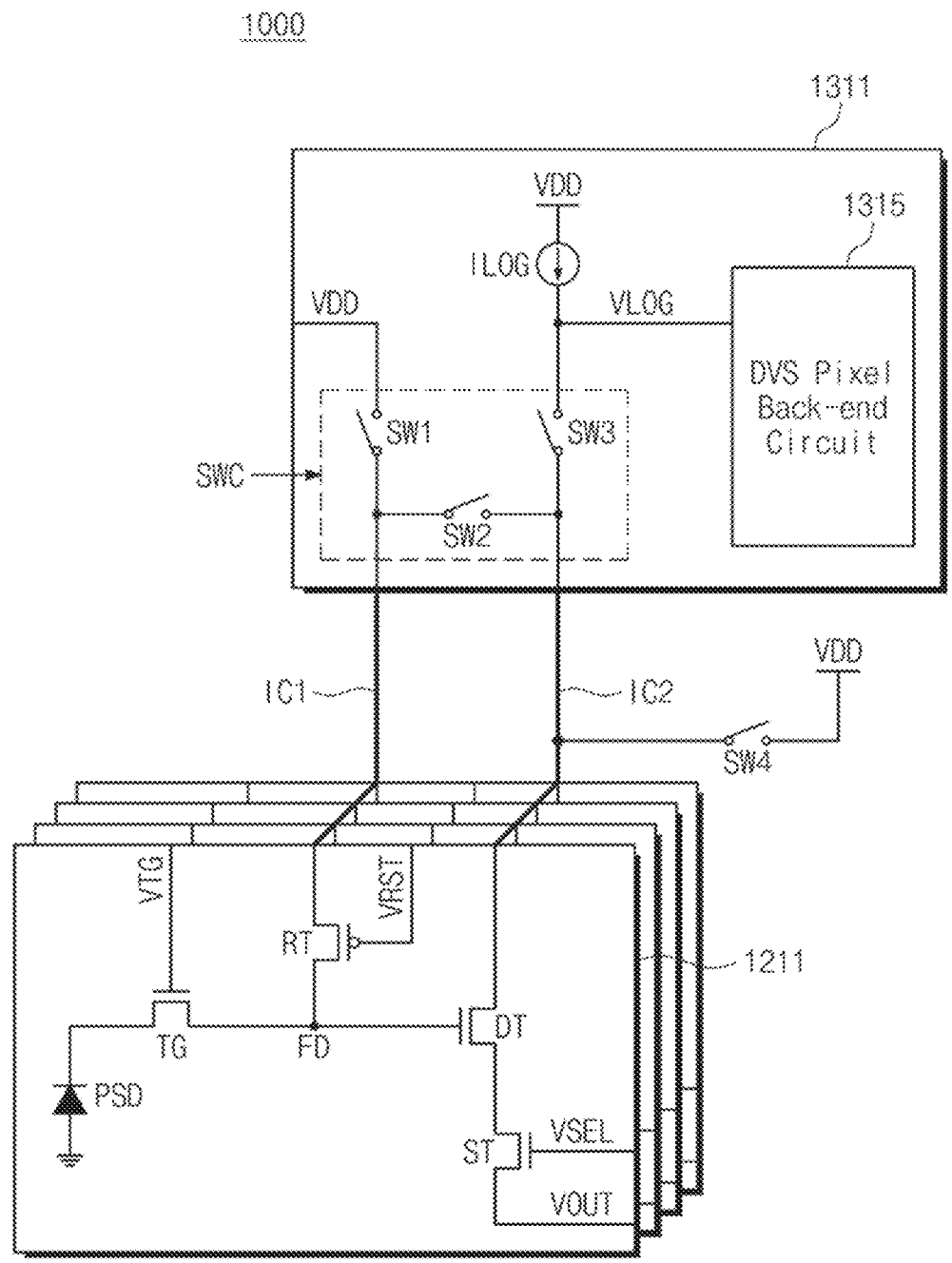
FIG. 24 illustrates a circuit diagram of an image sensor according to an embodiment of the disclosure.

FIG. 24 illustrates a circuit diagram of an image sensor according to an embodiment of the disclosure. In an embodiment, FIG. 24 shows the image sensor 1000 for implementing a circuit structure of FIG. 23. The image sensor 1000 includes the CIS pixels 1211 and the DVS pixels 1311.

The configuration of the CIS pixel 1211 is similar to that of FIG. 19. However, the reset transistor RT may be implemented with a PMOS transistor. One end of the reset transistor RT may be connected to a component(s) (e.g., SW1 and/or SW2) for changing an operating mode of the image sensor 1000 through the first interconnector IC1. One end of the drive transistor DT may be connected to a component(s) (e.g., SW2 and/or SW3) for changing the operating mode of the image sensor 1000 through the second interconnector IC2.

The configuration of the DVS pixel 1311 is the same as that of FIG. 19 except that the power supply voltage VDD is provided to the CIS pixel 1211 through the first switch SW1. Thus, redundant description will be omitted.

In the first mode, the image sensor 1000 may operate in the CIS mode. The first switch SW1 may be closed by the switch control signal SWC in a period for resetting the floating diffusion region FD, and the first switch SW1 may be opened in the remaining period. The second and third switches SW2 and SW3 are opened. In this case, the fourth switch SW4 may be closed.

In the second mode, the image sensor 1000 may operate in the DVS mode. The first and fourth switches SW1 and SW4 are opened by the switch control signal SWC, and the second and third switches SW2 and SW3 are closed by the switch control signal SWC. That is, one end of the reset transistor RT and one end of the drive transistor DT may be connected to the log voltage node. The transfer transistor TG is turned on by the transfer signal VTG. The reset transistor RT is turned on by the reset signal VRST.

According to the above embodiments, a DVS pixel of the disclosure does not include a photoelectric conversion device. Instead, the DVS pixel determines a type of an event by using a photoelectric conversion device PSD of a CIS pixel. In addition, in some embodiments, the PSD-free DVS pixel does not include some transistors and uses transistors of the CIS pixel. Therefore, the proposed architectures may reduce the size of an image sensor and decrease manufacturing costs.

According to embodiments of the disclosure, a dynamic vision sensor uses a photoelectric conversion device included in a CMOS image sensor.

Therefore, the size of an image sensor may be reduced, and manufacturing costs may decrease.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A sensor comprising:
a first substrate comprising a plurality of photoelectric conversion devices and a floating diffusion region connected to the plurality of photoelectric conversion devices; and
a second substrate configured to receive charges from the plurality of photoelectric conversion devices via a plurality of metal-to-metal bondings, and to determine a change in light intensity incident on the plurality of photoelectric conversion devices based on the charges,
wherein the first substrate is coupled with the second substrate via the plurality of metal-to-metal bondings, and
wherein the plurality of photoelectric conversion devices form a single dynamic vision sensor pixel.

2. The sensor of claim 1, further comprising a plurality of tens lenses on the plurality of photoelectric conversion devices,
wherein the plurality of metal-to-metal bondings are-vertically overlap with the plurality of lenses.

3. The sensor of claim 2, wherein the plurality of photoelectric conversion devices are disposed in a matrix form of N×N, and
wherein N is an integer greater than 1.

4. The sensor of claim 1, wherein the metal-to-metal bondings comprise Cu-to-Cu bondings.

5. The sensor of claim 2, wherein the sensor is configured to transmit an event signal as a packet-based signal.

6. The sensor of claim 2, wherein the sensor is configured to transmit an event signal as a frame-based signal.

7. The sensor of claim 5,
wherein the first substrate further comprises a plurality of transfer transistors, and
wherein each of the plurality of transfer transistors is connected to a corresponding one of the plurality of photoelectric conversion devices.

8. The sensor of claim 5, wherein the second substrate comprises a logarithmic amplifier and a feedback transistor configured to determine the change in the light intensity.

9. The sensor of claim 8, wherein the sensor is configured to receive an operating mode signal from an image signal processor, and
wherein the sensor is configured to output the event signal in response to the operating mode signal.

10. A sensor comprising:
a first substrate comprising a plurality of photoelectric conversion devices configured to generate charges; and a second substrate configured to receive a first plurality of charges and a second plurality of charges from the first substrate, wherein the first substrate is coupled with the second substrate via a plurality of metal-to-metal bondings, wherein the second substrate comprises a logarithmic amplifier and a feedback transistor configured to determine a change in light intensity, wherein the sensor is configured to output an image signal about an object based on the first plurality of charges and an event signal based on the second plurality of charges, and wherein the event signal represents a movement of the object.

11. The sensor of claim 10, wherein the sensor is configured to output the event signal as a packet-based signal.

12. The sensor of claim 11, further comprising a plurality of lenses on the plurality of photoelectric conversion devices, wherein the plurality of metal-to-metal bondings vertically overlap with the plurality of lenses.

13. The sensor of claim 12, wherein the sensor is configured to output the image signal as a frame-based signal.

14. The sensor of claim 10, wherein the metal-to-metal bondings comprise Cu-to-Cu bonding.

15. The sensor of claim 10, wherein the sensor is configured to receive an operating mode signal from an image signal processor, and wherein the sensor is configured to output the event signal or the image signal in response to the operating mode signal.

16. The sensor of claim 15, wherein the second substrate is configured to receive the first charges via a first path and receive the second plurality of charges via a second path different from the first path in response to the operating mode signal.

17. The sensor of claim 16, wherein the sensor is configured to output the image signal or the event signal to the image signal processor.

18. A sensor comprising:
a first substrate comprising a plurality of photoelectric conversion devices; and
a second substrate configured to receive charges from the plurality of photoelectric conversion devices, the second substrate being coupled with the first substrate,
wherein the second substrate comprises a logarithmic amplifier and a feedback transistor configured to determine a change in light intensity, and
wherein the sensor is configured to output an event signal related to a movement of an object as a packet-based signal or an image signal related to an image of the object as a frame-based signal.

19. The sensor of claim 18, further comprising a plurality of lenses on the plurality of photoelectric conversion devices, and wherein the first substrate is coupled with the second substrate via a plurality of metal-to-metal bondings.

20. The sensor of claim 19, wherein the sensor is configured to output the event signal or the image signal to a same image signal processor.

21. The sensor of claim 19, wherein the metal-to-metal bondings comprise Cu-to-Cu bondings.

22. The sensor of claim 18, wherein the sensor is configured to selectively output the event signal or the image signal to an image signal processor.

* * * * *

UNITED STATES PATENT AND TRADEMARK OFFICE
CERTIFICATE OF CORRECTION

PATENT NO. : 12,081,889 B2  
APPLICATION NO. : 18/297233  
DATED : September 3, 2024  
INVENTOR(S) : Yunjae Suh et al.

Page 1 of 1

It is certified that error appears in the above-identified patent and that said Letters Patent is hereby corrected as shown below:

In the Claims

In Claim 2, Column 18, Line 37, delete "tens".

In Claim 2, Column 18, Line 40-41, delete "are–".

Signed and Sealed this  
Thirteenth Day of May, 2025

Coke Morgan Stewart  
*Acting Director of the United States Patent and Trademark Office*